US007937719B2

(12) United States Patent
Akama et al.

(10) Patent No.: US 7,937,719 B2
(45) Date of Patent: May 3, 2011

(54) DISK DEVICE

(75) Inventors: Yusuke Akama, Tokorozawa (JP); Hiroshi Yokota, Tokorozawa (JP); Akira Takahashi, Nagoya (JP); Tetsuya Sugimura, Nagoya (JP)

(73) Assignee: Pioneer Corporation, Tokyo (JP)

( * ) Notice: Subject to any disclaimer, the term of this patent is extended or adjusted under 35 U.S.C. 154(b) by 527 days.

(21) Appl. No.: 12/159,136

(22) PCT Filed: Dec. 26, 2006

(86) PCT No.: PCT/JP2006/325923
§ 371 (c)(1),
(2), (4) Date: Jun. 25, 2008

(87) PCT Pub. No.: WO2007/074826
PCT Pub. Date: Jul. 5, 2007

(65) Prior Publication Data
US 2009/0150911 A1 Jun. 11, 2009

(30) Foreign Application Priority Data
Dec. 27, 2005 (JP) ................................. 2005-376525

(51) Int. Cl.
*G11B 17/04* (2006.01)
(52) U.S. Cl. ..................................................... 720/623
(58) Field of Classification Search .................. 720/601, 720/602, 603, 604, 605, 606, 623, 711, 646, 720/624, 621, 619, 713, 615, 626, 620, 704
See application file for complete search history.

(56) References Cited

U.S. PATENT DOCUMENTS

| 2010/0223635 A1* | 9/2010 | Miyata et al. | 720/620 |
| 2010/0299684 A1* | 11/2010 | Huang et al. | 720/620 |
| 2010/0313211 A1* | 12/2010 | Katsuki | 720/620 |

FOREIGN PATENT DOCUMENTS

| JP | 03-273559 | 12/1991 |
| JP | 2002-93011 | 3/2002 |
| JP | 2002-304798 A1 | 10/2002 |
| JP | 2004-246970 A1 | 9/2004 |
| JP | 2005-302214 A1 | 10/2005 |
| JP | 2005-346896 A1 | 12/2005 |

OTHER PUBLICATIONS

Office Action dated Jan. 20, 2009 corresponding to Japanese patent application No. 2005-376525 with English translation.
International Search Report of International Applicaiton No. PCT/JP2006/325923 dated Feb. 5, 2007.

* cited by examiner

*Primary Examiner* — Allen T Cao
(74) *Attorney, Agent, or Firm* — Kratz, Quintos & Hanson, LLP

(57) ABSTRACT

A disc device includes a casing, a disc processor, a drive motor, a transfer unit and a disc clamper. The transfer unit transfers an optical disc while holding the optical disc by driving the drive motor. The disc clamper switches a drive transmission of the drive unit in accordance with a holding condition of the optical disc with different diameters by the transfer unit to pivotally move the disc processor. The drive of the single drive motor effects both the transfer of the optical disc and the pivotal movement of the disc processor. A timing for transferring the optical disc and a timing for pivotally moving the disc processor can be suitably adjusted in accordance with the diameter of the optical disc.

6 Claims, 15 Drawing Sheets

DISK DEVICE

TECHNICAL FIELD

The present invention relates to a disc device for processing disc recording mediums with different diameters.

BACKGROUND ART

Conventionally, disc devices capable of processing discs with different diameters have been known. (e.g., see Patent Document 1).

The device disclosed in Patent Document 1 includes: a first drive motor for loading a disc into the device; an assembly holder having a turntable for the disc to be attached; a cam plate for pivotally moving the assembly holder; and a second drive motor for applying a drive force onto the cam plate. When the disc is inserted into the device, the disc is loaded into the inside of the device by a rotary drive force of the first drive motor. The loading of the disc is stopped at a predetermined timing in accordance with the diameter of the disc. Subsequently, the cam plate is moved by a rotary drive force of the second drive motor to pivotally move the assembly holder. Thus, the disc is attached to the turntable of the assembly holder.

[Patent Document 1] JP-A-2002-304798 (pages 4 to 24, FIGS. 1 to 5, FIGS. 12 to 17, FIGS. 19 to 22, FIG. 42 and FIG. 43)

DISCLOSURE OF THE INVENTION

Problems to be Solved by the Invention

Incidentally, a thin disc device adapted to be mounted on a notebook personal computer and the like and capable of loading discs of different diameters has recently been in demand. Such thin disc devices are standardized in advance with entire size thereof, the position of an attachment for attaching the disc devices on a personal computer and the like. Accordingly, the disc device has to be constructed to comply with the standard.

Further, such disc device as disclosed in the above Patent Document 1 that is capable of loading discs of different diameters requires adjustment of the timing for loading a disc and the timing for pivotally moving the assembly holder in accordance with the diameter of the disc. In case the timings are not synchronized, the disc may not be able to be attached on the turntable. Accordingly, a technique for suitably adjusting the timings in accordance with the diameters of the discs has been desired.

An object of the present invention is to provide a disc device capable of downsizing and also capable of suitably processing discs with different diameters.

Means for Solving the Problems

A disc device according to an aspect of the invention includes: a casing with a slit-shaped opening through which a disc-shaped recording medium with different diameters is capable of being inserted and ejected; a traverse body comprising a turntable for detachably clamping the recording medium and an information processor that conducts at least one of recording processing for recording information on the recording medium clamped on the turntable and reading processing for reading the information stored on the recording medium, the traverse body being supported in the casing in a manner capable of pivotal movement; a drive unit provided in the casing; a transfer unit provided in the casing, the transfer unit holding and transferring the recording medium between the opening and a position for the recording medium to be clamped by the turntable by driving the drive unit; a shift cam that is engaged with the traverse body and is moved in a predetermined direction by driving the drive unit to pivotally move the traverse body; and a moving unit that is moved in accordance with the holding condition of the recording medium with different diameters by the transfer unit to switch the drive transmission of the driving of the drive unit to the shift cam, in which the transfer unit includes a cam pressing member that pushes the shift cam in a moving direction of the shift cam when the recording medium is transferred to the position for the recording medium to be clamped by the turntable, the moving unit includes a second pressing wall that is advanced and retracted along a direction intersecting the moving direction of the shift cam in conjunction with the movement of the moving unit to switch a pushing position of the shift cam by the cam pressing member.

BEST MODE FOR CARRYING OUT THE INVENTION

Figure 1:
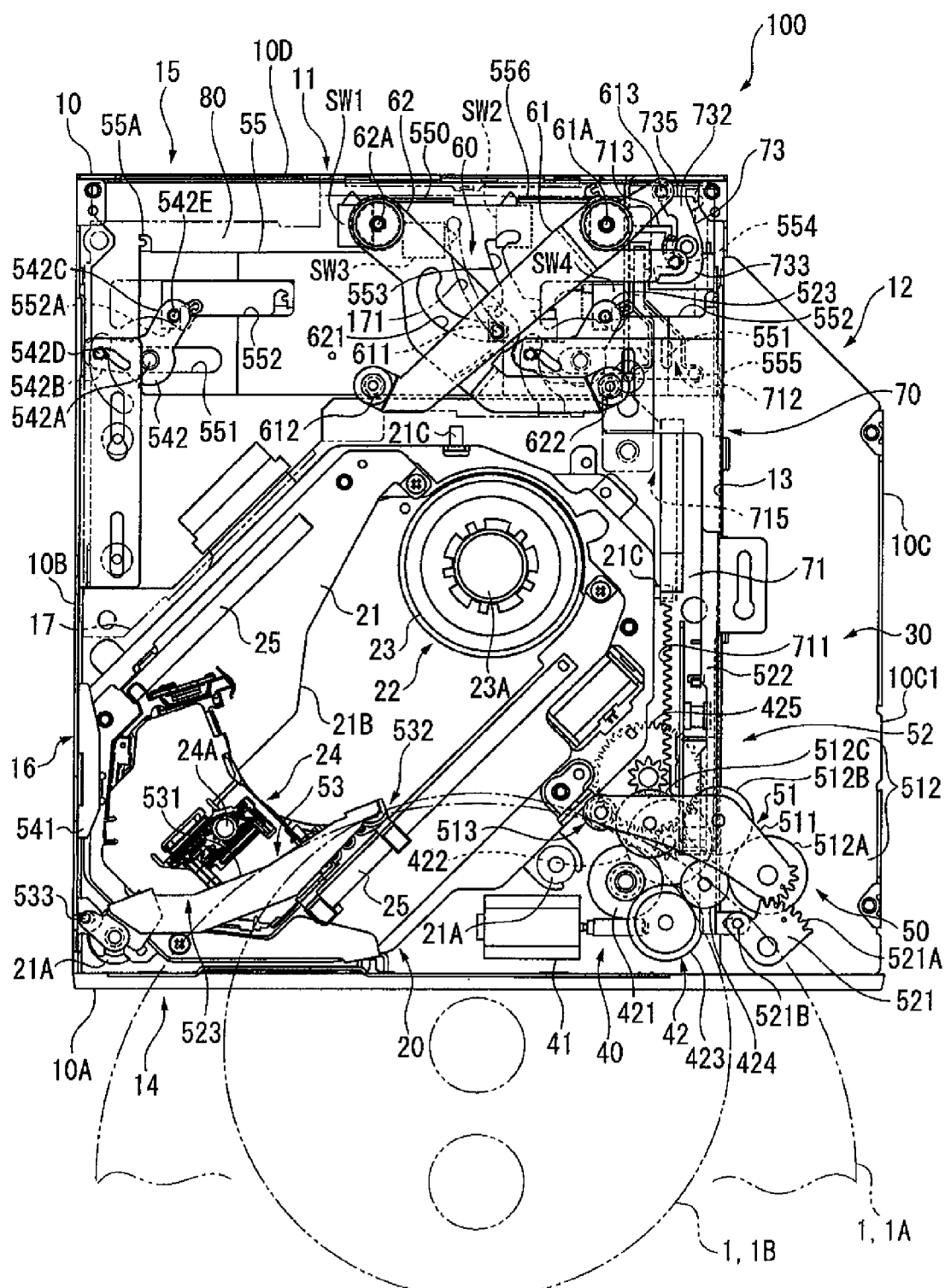
FIG. 1 is a top view showing an initial interior arrangement of a disc device as a recording medium drive according to the present invention.
Figure 2:
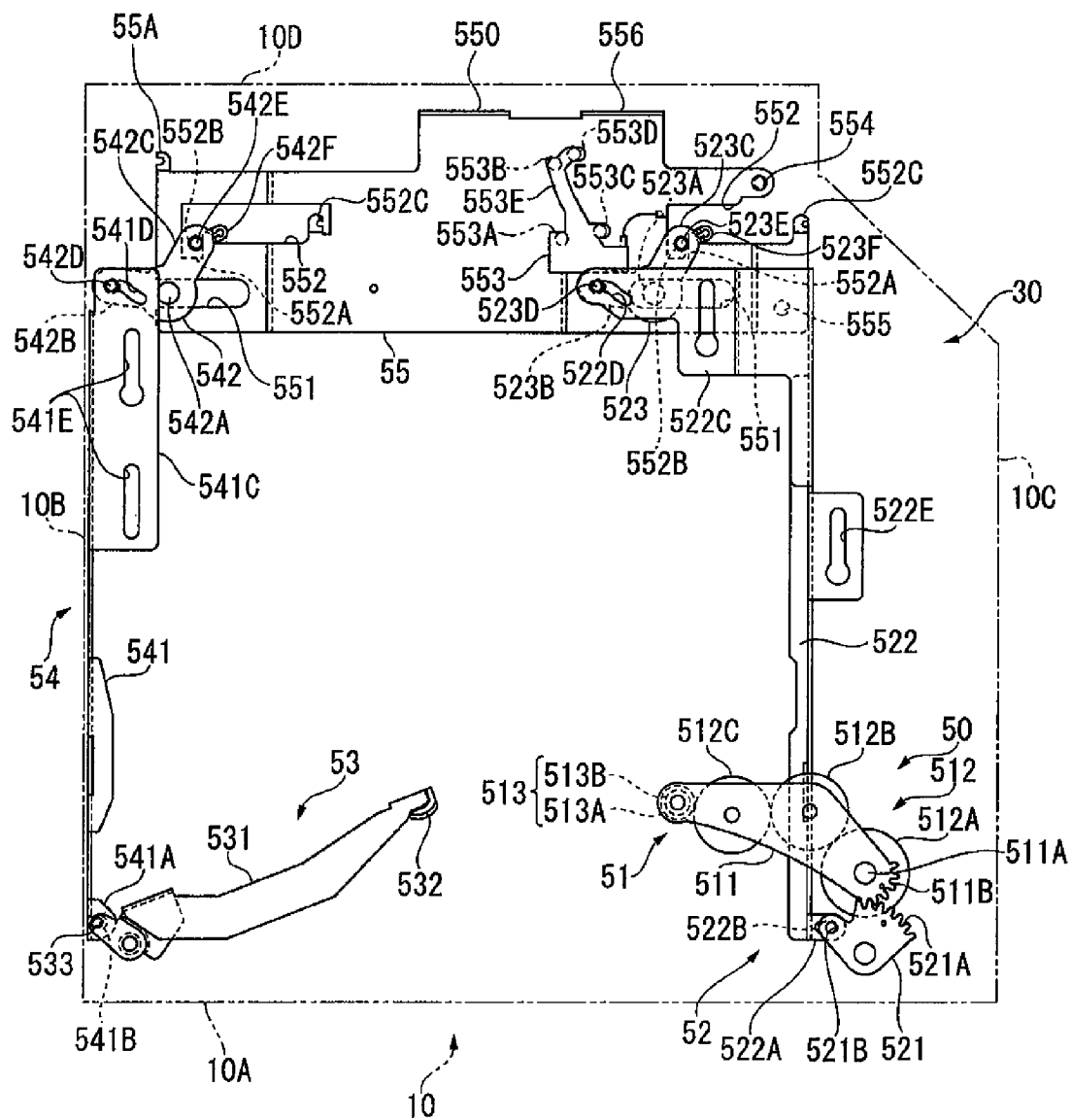
FIG. 2 is a top view showing an arrangement of an unloading unit of the disc device.
Figure 3:
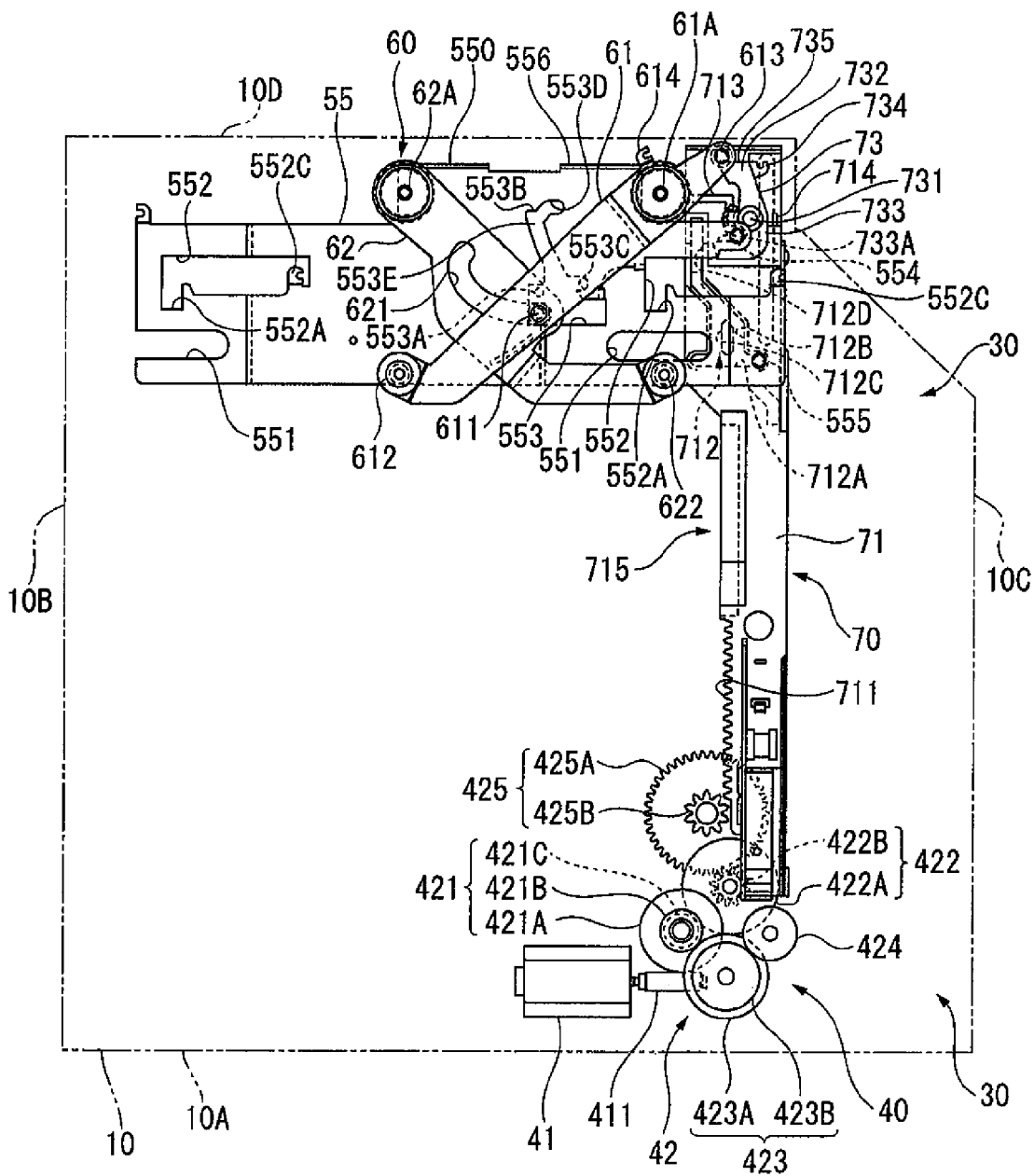
FIG. 3 is a top view showing an arrangement of the loading unit and a clamper of the disc device.
Figure 4:
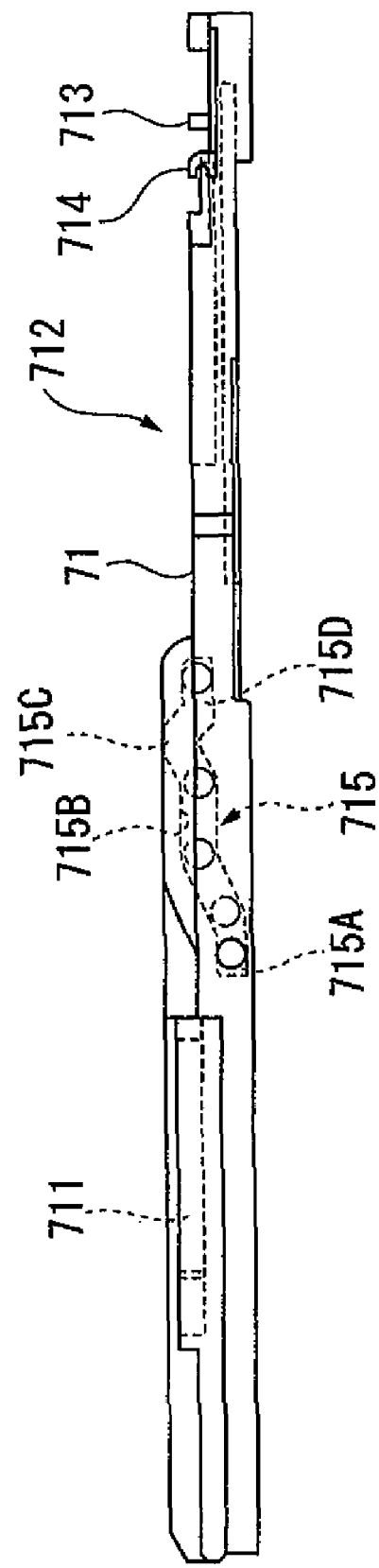
FIG. 4 is a side view showing a side of a first shift cam of the clamper of the disc device.

A disc device according to an embodiment of the present invention will be described below with reference to the attached drawings. FIG. 1 is a top view showing an initial interior arrangement of the disc device as a recording medium drive according to the present invention. FIG. 2 is a top view showing an arrangement of a loading unit of the disc device. FIG. 3 is a top view showing an arrangement of the loading unit and a clamper of the disc device. FIG. 4 is a side view showing a right-wall side of a first shift cam of the clamper of the disc device.

[Arrangement of Disc Device]

In FIG. 1, the numeral 100 denotes a disc device serving as a recording medium driver according the embodiment of the present invention. The disc device 100 performs such information processing as reading-processing or recording-processing on an optical disc 1 (disc recording medium), thereby reading information recorded on a recording surface (not shown) provided on at least one surface of the optical disc 1 or recording a variety of information on the recording surface of the optical disc 1. The disc device 100 is a so-called thin slot-in disc device attached to, for instance, an electric equipment such as a notebook personal computer of which thickness is relatively limited. Incidentally, though the thin disc device 100 attached to a notebook personal computer is exemplified in the present embodiment, the disc device 100 may alternatively be installed in, for instance, a gaming machine, a video device for recording/reproducing image data, and the like. Further, the disc device 100 may perform only one of the reading processing and recording processing.

In addition, the disc unit 100 can accept a large-diameter disc 1A with 12 cm diameter and a small-diameter disc 1B having 8 cm diameter as the optical disc 1. The disc recording medium is not limited to the optical disc 1 but may be other disc recording mediums such as a magnetic disc or a magnetic optical disc.

The disc unit device includes a substantially box-shaped casing 10 having an inner space, an exemplary material of which is a metal. In the casing 10, a lower side of the casing 10 shown in FIG. 1 may be referred to as a front face 10A, a left lateral wall of the casing 10 shown in FIG. 1 may be referred to as a left wall 10B, a right lateral wall of the casing 10 shown in FIG. 1 may be referred to as a right wall 10C and an upper side in FIG. 1 may be referred to as a rear face 10D.

The casing 10 includes a casing body 11 and a wing 12 provided on the right side of the casing body 11 in FIG. 1. The top faces of the casing body 11 and the wing 12 are flush with each other while the bottom faces thereof are located at different height. Specifically, the distance from the top face to the bottom face of the wing 12 is smaller than that of the casing body 11. A stepped wall 13 rising from the bottom face of the casing body 11 to connect the bottom faces of the casing body 11 and the wing 12 is provided on the casing body 11 near the right wall 10C.

The front face 10A of the casing 10 is provided with an insertion-and-ejection opening 14 for inserting/ejecting the optical disc 1, the insertion-and-ejection opening 14 extending from the casing body 11 to the wing 12 in the right-and-left direction of FIG. 1. A connector section 15 is provided on the rear face 10D of the casing 10 near the left wall 10B. The connector section 15 is adapted to be connected with an external equipment (e.g. a personal computer) arranged outside the disc device 100, to which a plug for transmitting/receiving various information from the external equipment or feeding/receiving electric power is connected.

The casing 10 internally includes a disc processor 20 (a traverse body of the present invention), a transfer unit 30 for transferring the optical disc 1, and a control circuit 80.

The disc processor 20 longitudinally extends from a position near the insertion-and-ejection opening 14 of the casing 10, i.e. from the front face 10A on the side of the left wall 10B approximately toward the center of the casing 10. The disc processor 20 includes a base 21 that longitudinally extends substantially in the same direction as the longitudinal direction of the disc processor 20, an exemplary material of which is metal plate.

The base 21 is attached via an elastic floating rubber 21A provided near the insertion-and-ejection opening 14 on the side of the left wall 10B in a manner pivotally movable relative to the casing 10. In other words, the base 21 is pivotally movable around the attachment position near the insertion-and-ejection opening 14 on the side of the left wall 10B. The base 21 is longitudinally cut out to substantially centrally form a longitudinal processor opening 21B. A disc rotation driver 22 is disposed near a first end of the processor opening 21B of the base 21, i.e., substantially at the center of the casing 10. The disc rotation driver 22 includes a spindle motor (information processor: not shown), and a turntable 23 provided integrally with an output shaft of the spindle motor. The spindle motor is controllably connected to the control circuit 80 and driven by electricity supplied from the control circuit 80. The turntable 23, which is provided substantially at the center inside the casing 10, is rotated with the optical disc 1 being disposed thereon.

At the center of the turntable 23, a disc engaging portion 23A on which a center hole (circular hole) provided at the center of the optical disc 1 is engaged/disengaged protrudes toward the top face. Claw members (not shown) that protrude toward the top face with the optical disc 1 being engaged with the disc engaging portion 23A to prevent detachment of the optical disc 1 are provided around the disc engaging portion 23A.

The base 21 includes an information processor 24. The information processor 24, which is supported by a pair of guide shafts 25 while bridging the guide shafts 25, is moved toward and away from the turntable 23 within the processor opening 21B by a moving mechanism (not shown). The information processor 24 has a pickup that includes: a light source (not shown); a pick-up lens 24A for converging light of the light source; and a light sensor (not shown) for detecting specular light reflected from the optical disc 1. The information processor 24 is located on the base 21 near the front face 10A except when the optical disc 1 is held on the turntable 23 (playable state), which is moved toward and away from the turntable 23 after the optical disc 1 is held by the turntable 23.

The transfer unit 30 loads the optical disc 1 inserted from the insertion-and-ejection opening 14 into the inside of the casing 10, mounts the loaded optical disc 1 onto the turntable 23 of the disc processor 20 and unloads the optical disc 1 inside the casing 10 toward the outside. The transfer unit 30 includes a drive unit 40, a loading unit 50 (loading/unloading unit), an unloading unit 60, a disc clamper 70 and the like.

The drive unit 40 feeds a drive power for driving the respective components of the transfer unit 30. The drive unit 40 includes a drive motor 41 (drive unit) and drive transmission gears 42 (drive transmitter).

The drive motor 41 is disposed near the insertion-and-ejection opening 14 of the front face 10A of the casing 10 in a space formed between the disc processor 20 and the stepped wall 13, which is a dead space by the provision of the disc processor 20.

The drive motor 41 is electrically connected with the control circuit 80, which rotates a rotary shaft thereof in accordance with a control signal from the control circuit 80. A worm gear 411 is provided at a tip end of the rotary shaft. The worm gear 411 transmits a rotary drive force to the drive transmitting gears 42.

The drive transmitting gears 42 includes a first transmission gear 421, a shift drive branch gear 422, a roller drive branch gear 423, a second transmission gear 424 and a cam shift gear 425.

The first transmission 421 includes a first large-diameter transmission gear 421A, a first top-side small-diameter transmission gear 421B coaxial with the first large-diameter gear 421 and integrated on a top side of the first large-diameter transmission gear 421A, and a first bottom-side small-diameter transmission gear 421C having a smaller diameter and integrated on a bottom side of the first large-diameter transmission gear 421A. The first large-diameter transmission gear 421A is meshed with the worm gear 411 to convert the rotary drive force of the drive motor 41 into an axial force orthogonal to the bottom side of the casing 10. The first bottom-side small-diameter transmission gear 421C provided on the bottom side of the first large-diameter transmission gear 421A is meshed with the shift drive branch gear 422. The first top-side small-diameter transmission gear 421B provided on the top side of the first large-diameter transmission gear 421A is meshed with the roller drive branch gear 423. Accordingly, the first transmission gear 421 transmits the rotary drive force from the drive motor 41 toward the shift drive branch gear 422 and the roller drive branch gear 423.

The shift drive branch gear 422 includes a large-diameter shift drive branch gear 422A and a drive branch pinion 422B coaxial with the large-diameter shift drive branch gear 422A and integrated on the bottom side of the drive branch pinion 422B. The large-diameter shift drive branch gear 422A is meshed with the first bottom-side small-diameter transmission gear 421C. The drive branch pinion 422B is meshed with the cam shift gear 425. Accordingly, the shift drive branch gear 422 transmits the rotary drive force transmitted from the first transmission gear 421 to the cam shift gear 425. The shift drive branch gear 422 is rotatably provided on the bottom face of the casing body 11. The thickness from the bottom face of the casing body 11 to the top face of the large-diameter shift drive branch gear 422A is smaller than the height of the stepped wall 13. Accordingly, a space is provided on the top side of the shift drive branch gear 422 to the height of the bottom face of the wing 12, which serves as a movement path of below-described first shift cam 71.

The roller drive branch gear 423 includes a large-diameter roller drive branch gear 423A and a small-diameter roller drive branch gear 423B coaxial with the large-diameter roller drive branch gear 423A and integrated on the top side of the large-diameter roller drive branch gear 423A. The large-diameter roller drive branch gear 423A is meshed with the first top-side small-diameter transmission gear 421B. The small-diameter drive branch gear 423B is meshed with the second transmission gear 424. Accordingly, the roller drive branch gear 423 transmits the rotary drive force transmitted from the first transmission gear 421 to the second transmission gear 424. The roller drive branch gear 423 is provided on the bottom face of the casing body 11 substantially at the same height as that of the bottom face of the wing 12. Accordingly, a space is provided between the bottom face of the roller drive branch gear 423 and the bottom face of the casing body 11, which serves as a movement path of the first shift cam 71.

The second transmission gear 424 is provided on a support piece projecting from the bottom face of the wing 12 toward the left wall 10B. The second transmission gear 424 is meshed with the small-diameter drive branch gear 423B and a below-described loading arm 51 of the loading unit 50. Accordingly, the second transmission gear 424 transmits the rotary drive force transmitted from the roller drive branch gear 423 to the loading arm 51.

The cam shift gear 425 includes a large-diameter shift gear 425A with larger diameter and a pinion gear 425B with smaller diameter, the pinion gear 425B being coaxial with the large-diameter shift gear 425A and integrated on the top side of the large-diameter shift gear 425A. The large-diameter shift gear 425A is provided on the bottom side of the first shift cam 71, i.e. between the casing body 11 and the first shift cam 71. The pinion gear 425B is provided on an advancement-retraction movement path of a rack 711 provided on an end face of the first shift cam 71. The large-diameter shift gear 425A is meshed with the drive branch pinion 422B of the shift drive branch gear 422. On the other hand, the pinion gear 425B is provided in a manner capable of being meshed with the below-described first shift cam 71 of the disc clamper 70.

As shown in FIG. 2, the loading unit 50 is driven by a drive force fed by the drive unit 40 to load the optical disc 1 inserted from the insertion-and-ejection opening 14 into the casing 10. The loading unit 50 includes the loading arm 51, a loading link mechanism 52, a disc guide arm 53 (guide arm), a disc guide link mechanism 54 and a link plate 55.

The loading arm 51 is longitudinally provided. A first end of the loading arm 51 is rotatably provided near the insertion-and-ejection opening of the wing 12 and a second end of the loading arm 51 is capable of advancement and retraction relative to the center of the casing 10. The loading arm 51 is provided with a roller 513 capable of holding the optical disc 1 on a distal end thereof. The loading arm 51 transfers the optical disc 1 along a transfer path in accordance with the rotation of the roller 513.

The loading arm 51 is rotated toward the right wall 10C to a position capable of guiding the optical disc 1 in accordance with the diameter of the optical disc 1 to be transferred. In other words, when, for instance, a large-diameter disc 1A is to be transferred, the loading arm 51 is rotated near to the right wall 10C. On the other hand, when a small-diameter disc 1B is to be transferred, the loading arm 51 is rotated to a position capable of transferring the small-diameter disc 1B, i.e. to a position where a distance between a centerline extended forward and backward from the rotary center of the turntable 23 and the roller 513 becomes approximately 4 cm. In contrast, when the disc processor 20 is moved toward the top side to clamp the optical disc 1 onto the turntable 23 (playable state), the loading arm 51 is rotated toward the right wall 10C so that the roller 513 is spaced apart from the periphery of the optical disc 1. The loading arm 51 includes a longitudinal loading arm body 511, a roller drive 512 provided on the loading arm body 511 and the above-described roller 513.

The loading arm 511 is a plate member longitudinally extending along the longitudinal direction of the loading arm 51. A support portion 511A is provided on a base end of the loading arm body 511. The bottom face of the support portion 511A is rotatably supported by a shaft protruding from the bottom face toward the top face of the wing 12, so that a distal end of the loading arm body 511 is capable of advancement and retraction toward the inside of the casing 10. A proximal end of the loading arm body 511 is provided by an arc of a predetermined diameter around the support portion 511A. A first gear 511B is provided along the arc. A roller attachment hole (not shown) for attaching the roller 513 is provided on a distal end of the loading arm body 511.

The roller drive 512 is provided on a bottom side of the loading arm body 511. The roller drive 512 includes a first roller drive gear 512A rotated around a shaft for supporting the support portion 511A of the loading arm body 511, a second roller drive gear 512B meshed with the first roller drive gear 512A, and a third roller drive gear 512C meshed with the second roller drive gear 512B. The first roller drive gear 512A is meshed with the second transmission gear 424 of the drive unit 40 to transmit the drive force from the drive unit 40. The third roller drive gear 512C is meshed with the roller 513 to transmit the drive force transmitted from the drive unit 40 to the roller 513 through the first and second roller drive gears 512A, 512B.

The first to the third roller drive gears 512A, 512B, 512C have a thickness substantially the same as or slightly smaller than a gap between the loading arm body 511 and the wing 12, so that the first to the third roller drive gears 512A, 512B, 512C do not interfere with the wing 12 when the loading arm 51 is rotated.

The roller 513 is rotatably attached to the roller attachment hole on the distal end of the loading arm body 511. The roller 513 includes a roller gear 513A provided on the bottom side of the loading arm body 511, and a roller body 513B provided on the top side of the loading arm body 511. The roller gear 513A and the roller body 513B are integrated by a shaft penetrating the roller attachment hole of the loading arm body 511.

The roller gear 513A is meshed with the third roller drive gear 512C to be rotated by a rotation of the third roller drive gear 512C.

The roller body 513B is a substantially cylindrical member with an axis extending in a direction substantially orthogonal to a surface of the loading arm body 511. The roller body 513B has a recessed portion with smaller diameter at an axially central portion than that on the top and bottom sides of the roller body 513B. A circumference of the roller body 513B is provided by an elastic member such as synthetic resin and the like. The roller body 513B is rotated while holding the periphery of the optical disc 1 with the recessed portion, thereby advancing and retracting the optical disc 1 along the transfer path.

When a largest-diameter section of a large-diameter disc 1A passes the roller 513 in transferring the large-diameter disc 1A, the loading arm 51 is moved at the maximum toward the right wall 10C. At this time, the roller 513 is inserted to an escape hole 10C1 provided on the right wall 10C of the casing 10.

The loading link mechanism 52 includes a loading link arm 521, a loading slide plate 522 and a loading link lever 523.

The loading link arm 521 is rotatably provided on the bottom face of the wing 12. The loading link arm 521 is provided approximately as a sector, along an arc of which a second gear 521A engaged with the first gear 511B of the loading arm body 511 is provided. A loading link pin 521B protruding toward the bottom face of the wing 12 is provided on an inner side of the second gear 521A (i.e. on the left wall 10B side) of the loading link arm 521.

The loading slide plate 522 opposes to the stepped wall 13 and longitudinally extends in front-and-back direction (in a direction from the front face 10A to the rear face 10D of the casing 10). A first loading link engaging portion 522A that protrudes from a top-side periphery of the loading slide plate 522 toward the fight wall 10C to oppose to the bottom face of the wing 12 is provided on the side of the front face 10A of the loading slide plate 522.

A loading engaging groove 522B longitudinal in right-and-left direction is provided on the first loading link engaging portion 522A. The loading link pin 521B of the loading link arm 521 is engaged with the loading engaging groove 522B. When the loading link arm 521 is rotated in accordance with the rotation of the loading link arm 51, the loading link pin 521B advances and retracts forward and backward, so that the loading slide plate 522 slides forward and backward in accordance with the movement of the loading link pin 521B.

A second loading link engaging portion 522C protruding toward the inside of the casing is provided on the rear-face-10D side of the loading slide plate 522. A second loading engaging groove 522D that extends from a left-wall-10B side toward the front face 10A of the right wall 10C is provided on the second loading link engaging portion 522C.

A loading guide groove 522E extending forward and backward is provided approximately at the center of front-and-back direction of the loading slide plate 522 to define the slide movement direction of the loading slide plate 522.

As shown in FIG. 2, the loading link lever 523 is provided with a first lever 523B and a second lever 523C that extend from a rotary shaft 523A at a predetermined angle with each other.

The rotary shaft 523A is rotatably attached on the bottom face of the top plate 17. A first lever pin 523D protrudes from a distal end of the first lever 523B toward the top face. The first lever pin 523D is engaged with the second loading engaging groove 522D of the second loading link engaging portion 522C of the loading slide plate 522. Accordingly, when the loading slide plate 522 slides toward the front face 10A, the first lever pin 523D also moves toward the front face 10A, thereby rotating the loading link lever 523 anticlockwise. On the other hand, when the loading slide plate 522 slides toward the rear face 10C, the first lever pin 523D also moves toward the rear face 10D, thereby rotating the loading link lever 523 clockwise.

A second lever pin 523E protrudes from a distal end of the second lever 523C toward the bottom face. The second lever pin 523E is engaged with the below-described link plate 55. A spring mount 523F is provided on the distal end of the second lever 523C, which receives a spring (not shown) wound against the link plate 55. Accordingly, anticlockwise biasing force is constantly applied on the loading link lever 523. Specifically, the loading slide plate 522 is constantly biased toward the rear face 10D and the distal end of the loading arm 51 is biased to move to the center of the casing 10.

The second lever pin 523E protrudes from the distal end of the second lever 523C toward the bottom face. The second lever pin 523E is engaged with the below-described link plate 55. A spring mount 523F is provided on a distal end of the second lever 523C, which receives a spring (not shown) wound against the link plate 55. Accordingly, anticlockwise biasing force is constantly applied on the loading link lever 523. A spring mount 55A is provided on the link plate 55, which receives a spring (not shown) wound against the top plate 17. Accordingly, the link plate 55 is always biased toward the side of the right wall 10C. Specifically, the loading slide plate 522 is constantly biased toward the rear face 10D and the distal end of the loading arm 51 is biased to move to the center of the casing 10.

The disc guide arm 53 is longitudinally formed, whose base end is rotatably mounted in the vicinity of the left wall 10B of the front face 10A near the insertion-and-ejection opening 14. Accordingly, the distal end of the disc guide arm 53 is advanceable toward and retractable from the center of the casing 10. Further, the disc guide arm 53 is curved inward at a section between the base end and the distal end. Specifically, a mount 16 for attaching the disc device 100 to, for instance, a personal computer is provided on the left wall 10B on the side of the front face 10A and the disc guide arm 53 stays off from the mount by the curved section 533. Accordingly, when the disc guide arm 53 is rotated to the nearest position to the left wall 10B, the distal end of the disc guide arm 53 does not protrude to the top side of the disc processor 20, so that interference between the information processor 24 and the disc guide arm 53 can be avoided during the playable state.

A disc guide 532 that protrudes toward the bottom side is provided on the distal end of the disc guide arm 53. The disc guide 532 is a semicylindrical member having an axis vertically extending from the bottom side to the top side, which has an arcular section on an inside thereof. The disc guide 532 is in contact with the periphery of the optical disc to be transferred while transferring the optical disc 1 to hold the optical disc 1 together with the roller 513 of the loading arm 51. When the largest-diameter section of the large-diameter disc 1A passes the disc guide arm 53, the disc guide arm 53 is rotated to a position most adjacent to the left wall 10B. However, since the disc guide 532 is provided as a semicylindrical member, the disc guide 532 and the left wall 10B do not interfere with each other. Accordingly, the transfer of the optical disc 1 can be guided without enlarging the horizontal width of the disc device 100, thereby providing a disc device adapted for size reduction.

Further, a disc guide pin 533 that protrudes toward the bottom face is provided on the base end of the disc guide arm 53 near the left wall 10B. The disc guide pin 533 moves toward the front face 10A when the disc guide arm 53 is rotated toward the left wall 10B. In contrast, when the disc guide arm 53 moves toward the right wall 10C, the disc guide pin 533 moves toward the rear face 10D.

The disc guide arm 53 is rotated toward the left wall 10B to a position capable of guiding the optical disc 1 in accordance with the diameter of the optical disc 1 to be transferred. For instance, when a large-diameter disc 1A is to be transferred, the disc guide arm 53 is rotated to a position near the left wall 10B. On the other hand, when a small-diameter disc 1B is to be transferred, the disc guide arm 53 is rotated toward the left wall 10B to a position where a distance between the disc guide 532 and a centerline extended forward and backward from the rotary center of the turntable 23 becomes approximately 4 cm Further, the disc guide arm 53 is rotated near to the left wall 10B during the playable state, so that the disc guide 532 is spaced apart from the periphery of the optical disc 1.

The disc guide link mechanism 54 includes a disc guide slide plate 541 and a disc guide link lever 542.

The disc guide slide plate 541 opposes to the left wall 10B and longitudinally extends in front-and-back direction A first disc guide engaging portion 541A that extends from a bottom-side periphery to the rotary shaft of the disc guide arm 53 is provided on the disc guide slide plate 541 near the front face 10A. A horizontally longitudinal first disc guide link groove 541B is provided on the first disc guide link engaging portion 541A, with which the disc guide pin 533 is engaged. The disc guide slide plate 541 slides forward and backward in accordance with the movement of the disc guide pin 533 in front-and-back direction caused by the rotation of the disc guide arm 53.

A second disc guide link engaging portion 541C protruding toward the inside of the casing 10 is provided on the disc guide slide plate 541 near the rear face 10D. A second disc guide engaging groove 541D that is slanted from a side of the left wall 10B toward the front face 10A of the right wall 10C is provided on the second disc guide link engaging portion 541C.

A loading guide groove 541E extending forward and backward is provided approximately at the center of front-and-back direction of the disc guide slide plate 541 to guide the slide movement direction of the disc guide slide plate 541.

The disc guide link lever 542 is rotatable around a rotary shaft 542A provided on the bottom face of the top plate 17. The disc guide link lever 542 is provided with a first guide lever 542B and a second guide lever 542C that extend from the rotary shaft 542A at a predetermined angle with each other. A first guide lever pin 542D protrudes from a distal end of the first guide lever 542B toward the top face. The first guide lever pin 542D is engaged with the second disc guide engaging groove 541D of the second disc guide link engaging portion 541C. Accordingly, when the disc guide slide plate 541 slides toward the front face 10A, the first guide lever pin 542D also moves toward the front face 10A, thereby rotating the disc guide link lever 542 anticlockwise. On the other hand, when the disc guide slide plate 541 slides toward the rear face 10C, the first guide lever pin 542D also moves toward the rear face 10D, thereby rotating the disc guide link lever 542 clockwise.

A second guide lever pin 542E protrudes from the distal end of the second guide lever 542C to the bottom face. The second guide lever pin 542E is engaged with the below-described link plate 55. A spring mount 542F is provided on a distal end of the second guide lever 542C, which receives a spring (not shown) wound against the link plate 55. Accordingly, anticlockwise biasing force is constantly applied on the disc guide link lever 542. Specifically, the disc guide slide plate 541 is constantly biased toward the rear face 10D and the distal end of the disc guide arm 53 is biased to move toward the center of the casing 10.

The link plate 55 is provided on the casing 10 near the rear face 10D, which is a plate member that extends in right-and-left direction. The link plate 55 is movable in right and left directions in accordance with the movement of the loading arm 51 and the disc guide arm 53. When the optical disc 1 is not inserted (initial state), the link plate 55 is disposed nearest to the right wall 10C. The link plate 55 includes link guide grooves 551, lever engaging windows 552, an eject-restricting window 553, a select pin 554 (control member) and a cam control pin 555.

The link guide grooves 551 are provided on both of right and left ends of the link plate 55 at positions where the distances from the rear face 10D become substantially equal to each other to extend in right-and-left direction. The link guide grooves 551 respectively receive the above-described rotary shafts 523A and 542A of the loading link lever 523 and the disc guide link lever 542. Accordingly, the movement of the link plate 55 is set in right-and-left direction.

A pair of the lever engaging window 552 are respectively provided on the link guide groove 551 provided on the right and left side of the link plate 55 near the rear face 10D. The lever engaging windows 552 respectively include a lever pin engaging portion 552A with which the second lever pin 523E of the loading link lever 523 and the second guide lever pin 542E of the disc guide link lever 542 are engaged.

The lever pin engaging portions 552A are grooves extending in front-and-back direction, which respectively receives the second lever pin 523E and the second guide lever pin 542E. When the second lever pin 523E and the second guide lever pin 542E are moved to push the right and left walls of the lever pin engaging portion 552A, the link plate 55 slides in right and left direction.

Further, the dimension of the groove in right and left direction of the lever pin engaging portion 552A is slightly larger than the diameter of the second lever pin 523E and the second guide lever pin 542E. Accordingly, a gap 552B is provided in right and left direction between the second lever pin 523E/the second guide lever pin 542E and the lever pin engaging portion 552A.

The gap 552B is a rotation play that allows the loading link lever 523 and the disc guide link lever 542 to escape when, for instance, an impact is applied on the disc device 100 while transferring the optical disc 1. In other words, when there is no gap 552B therebetween, when an impact is applied to, for instance, move the loading arm 51 toward the right wall 10C, the disc guide arm 53 is also moved toward the left wall 10B in accordance with the movement. Accordingly, the periphery of the optical disc 1 cannot be held by the loading arm 51, where the disc guide arm 53 and the optical disc 1 may fall off to cause a malfunction. In contrast, when the gap 552B is provided, even when the loading arm 51 is slightly moved toward the right wall 10C by applying an impact, the disc guide arm 53 is not moved, thereby preventing the optical disc 1 from falling off.

Further, spring-engaging portions 552C are respectively provided on the lever engaging window 552 on the side of the right wall 10C. Springs (not shown) are provided between the spring-engaging portions 552C and the spring mounts 523F, 542F, which bias clockwise the loading link lever 523 and the disc guide link lever 542.

The eject-restricting window 553 is a window provided approximately at the center of the link plate 55. The eject-restricting window 553 restricts the movement of a below-described first eject arm 61 of the unloading unit 60. The eject-restricting window 553 includes a small-diameter restricting/engaging portion 553A, a large-diameter restricting/engaging portion 553B, a small-diameter spacing/engaging portion 553C and a large-diameter spacing/engaging portion 553D. Further, an eject pin 611 provided on the first eject arm 61 is inserted through the eject-restricting window 553. The small-diameter restricting/engaging portion 553A, the large-diameter restricting/engaging portion 553B, the small-diameter spacing/engaging portion 553C and the large-diameter spacing/engaging portion 553D are in communication with each other so that the eject pin 611 can be moved therein to be engaged/disengaged with the respective portions. The engagement/disengagement of the eject pin 611 and the portions 553A, 553B, 553C, 553D changes in accordance with right-and-left slide movement of the link plate 55 in conjunction with the loading arm 51 and the disc guide arm 53.

The small-diameter restricting/engaging portion 553A is provided on the eject-restricting window 553 near the front face 10A and near the left wall 10B. The eject pin 611 is engaged with the small-diameter restricting/engaging portion 553A when a small-diameter disc 1B is capable of being held by the turntable 23 (clampable state).

The large-diameter engaging portion 553B is provided on the eject-restricting window 553 on the side of the rear face 10D and near the left wall 10B. Specifically, the large-diameter restricting/engaging portion 553B is provided on a distal end of a large-diameter-corresponding groove 553E that extends from right side of the small-diameter restricting/engaging portion 553A toward the rear face 10D. The eject pin 611 is engaged with the large-diameter restricting/engaging portion 553B when a large-diameter disc 1A is capable of being held by the turntable 23 (clampable state).

The small-diameter spacing/engaging portion 553C is provided on the right-wall-10C side of the small-diameter restricting/engaging portion 553A slightly near the rear face 10D. The eject pin 611 is engaged with the small-diameter spacing/engaging portion 553C when a small-diameter disc 1B is capable of being held by the turntable 23 and capable of being information-processed by the information processor 24 (playable state).

The large-diameter spacing/engaging portion 553D is provided on the right-wall-10C side of the large-diameter restricting/engaging portion 553B slightly near the rear face 10D. The eject pin 611 is engaged with the large-diameter spacing/engaging portion 553D when the small-diameter disc 1B is capable of being held by the turntable 23 and capable of being information-processed by the information processor 24 (playable state).

The select pin 554 protrudes from the link plate 55 near the rear face 10D and near the right wall 10C toward a below-described first shift cam 71 of the disc clamper 70 The cam control pin 555 protrudes from the link plate 55 near the front face 10A and near the right wall 10C toward the first shift cam 71 of the disc clamper 70 in the same manner as the select pin 554.

Switch pieces 550, 556 that are bent toward the bottom face of the casing 10 are provided on a periphery of the link plate 55 near the rear face 10D. The switch pieces 550, 556 switches a first switch SW1 and a second switch SW2 provided on the control circuit 80 disposed on the bottom face of the casing 10 in accordance with right and left movement of the link plate 55.

The first switch SW1 and the second switch SW2 are provided on the control circuit 80 near the rear face 10D on the way of the right and left movement of the switch pieces 550, 556. The first switch SW1 is provided near the left wall 10B adjacent to the connector section 15. The second switch SW2 is provided on the side of the right wall 10C relative to the first switch SW1.

Specifically, the first switch SW1 is provided at a position capable of detecting a predetermined rotation (retraction) of a first longitudinal end of the loading arm 51 from the transfer path that extends in front-and-back direction. The second switch SW2 is provided at a position capable of detecting a predetermined rotation of the first longitudinal end of the loading arm 51 from a state advanced into the transfer path, i.e. rotation from a standby state to be moved by the optical disc 1.

The first switch SW1 and the second switch SW2 include a switch body and a movable piece that protrudes from the switch body toward the rear face 10D and is capable of advancement and retraction relative to the switch body. The first switch SW1 and the second switch SW2 are at OFF state when the movable piece is protruded. The OFF state is detected by the control circuit 80 as "H (High)" level based on a reference voltage supplied by the control circuit 80. On the other hand, when the switch pieces 550, 556 are in contact with the movable piece, the movable piece is moved toward the inside of the switch body to be ON state, which is detected by the control circuit 80 as "L (Low)" level based on the reference voltage supplied by the control circuit 80.

Both of the first switch SW1 and the second switch SW2 are set as the OFF state with the movable piece being protruded toward the rear face 10D at an initial state where the optical disc 1 is not inserted. When the optical disc 1 is inserted and the link plate 55 is moved toward the left wall 10B in accordance with the rotation of the loading arm 51 and the disc guide arm 53, the second switch SW2 is immediately turned into ON state (L level). Subsequently, when the link plate 55 is moved further toward the left side, the first switch SW1 is turned into ON state (L level).

Next, the arrangement of the unloading unit 60 will be described below. As shown in FIGS. 1 and 3, the unloading unit 60 includes a first eject arm 61 and a second eject arm 62. The first and the second eject aim are intersected in a rotatable manner near the rear face 10D of the casing 10. Specifically, the first eject arm 61 longitudinally extends from the side of the rear face 10D near the right wall 10C toward the left wall 10B. The second eject arm 62 longitudinally extends from the side of the rear face 10D near the left wall 10B toward the right wall 10C. Rotary center shafts 61A, 62A of the first and the second eject arms 61, 62 are respectively spaced from the rear face 10D toward the front face 10A by a predetermined distance, the rotary center shafts 61A, 62A being respectively disposed between a centerline L passing through the center of the turntable 23 and the right wall 10C and between the centerline L and the left wall 10B. At this time, the rotary center shafts 61A and 62A are mutually symmetrical relative to the centerline L. According to the above arrangement, the rotary center shafts 61A, 62A can be attached to a position without interfering with the first shift cam 71 and the connector portion 15, so that the distal end of the first and the second eject arms 61, 62 can be rotated near to the rear face 10D when a large-diameter disc 1A is inserted.

The first eject arm 61 includes the eject pin 611 as described above. The eject pin 611 is engaged with the arm link groove 621 provided on the second eject arm 62, the eject restricting window 553 of the link plate 55, and an eject arm restricting groove 171 provided on the top plate 17 disposed on the top side of the link plate 55. The eject pin 611 is rotated along the eject arm restricting groove 171, which is engaged on the way of the rotation with the small-diameter restricting/engaging portion 553A, the large-diameter restricting/engaging portion 553B, the small-diameter spacing/engaging portion 553C and the large-diameter spacing/engaging portion 553D of the eject restricting window 553 to restrict the movement thereof. The movement of the eject pin 611 along the arm link groove 621 pushes out the second eject arm 62, so that the second eject arm 62 is rotated in conjunction with the first eject arm 61.

Further, a first disc abutment portion 612 for the optical disc 1 to be contacted is provided on the distal end of the first eject arm 61 near the left wall 10B. A cam pressing pin 613 (cam pressing member) that protrudes toward the first shift cam 71 is provided on the base end of the first eject arm 61 near the right wall 10C. When the first eject arm 61 is rotated, the cam pressing pin 613 pushes and moves the first shift cam 71 toward the front face 10A in accordance with the rotation of the first eject arm 61.

A spring-engaging-projection 614 is provided around the rotary center shaft 61A of the first eject arm 61. A spring is attached between the spring-engaging-projection 614 and a spring-engaging portion (not shown) of the second eject arm 62, so that the first eject arm 61 is constantly biased anticlockwise, i.e. in a direction for the first disc abutment portion 612 to be rotated toward the front face 10A.

Further, a third switch SW3 electrically coupled with the control circuit 80 is provided on a movement path of the eject pin 611, specifically, at a position corresponding to an end of the eject arm restricting groove 171 near the rear face 10D. The third switch SW3 detects a holding state of the optical disc 1 (1A, 1B) of the transfer unit 30, which varies when the optical disc 1 (1A, 1B) with different diameters are loaded. Specifically, the third switch SW3 detects a rotation of the first eject arm 61 (i.e. advancement into the transfer path) that holds the optical disc 1 (1A, 1B) with different diameters relative to the transfer path.

Similarly to the first and the second switches SW1, SW2, the third switch SW3 includes a switch body and a movable piece protruding from the switch body, where the movable piece protrudes to the right side of the eject arm restricting groove 171. When the first eject arm 61 is rotated and the eject pin 611 moves toward the rear-face-10D side end of the eject arm restricting groove 171, the movable piece is pressed in to turn the third switch SW3 into ON state (L level). Accordingly, the control circuit 80 recognizes switching of the third switch SW3 between the ON/OFF states (L/H levels) to recognize the detecting state of the third switch SW3.

As described above, the second eject arm 62 is provided substantially at the longitudinal center thereof with the arm link groove 621 that is curved substantially in an arc shape. When the eject pin 611 moves within the arm link groove 621, the periphery of the arm link groove 621 is pushed by the eject pin 611 to rotate the second eject arm 62.

A second disc abutment portion 622 for the optical disc 1 to be contacted is provided at the distal end of the second eject arm 62. The second disc abutment portion 622 is located constantly at a position symmetrical with the first disc abutment portion 612 relative to the centerline L. In other words, when the first and the second eject arms 61, 62 are rotated, the first disc abutment portion 612 and the second disc abutment portion 622 are rotated in a manner constantly axisymmetric relative to the centerline L. The first disc abutment portion 612 and the second disc abutment portion 622 of the first and the second eject arms 61, 62, the roller 513 of the loading arm 51 and the disc guide 532 of the disc guide arm 53 hold the periphery of the optical disc 1 (1A, 1B) to transfer the optical disc 1.

Next, the arrangement of the disc clamper 70 (switching unit) of the present invention will be described below. As shown in FIGS. 1 and 3, the disc clamper 70 includes the first shift cam 71, a second shift cam (not shown) provided on the rear-face-10D side of the disc processor 20 and a select arm 73 (moving unit). The first shift cam 71 and the select arm 73 constitute the switching unit of the present invention.

The first shift cam 71 longitudinally extends in front-and-back direction along the stepped wall 13 of the casing 10. The first shift cam 71 is moved nearest to the rear face 10D at an initial state, which is pressed toward the front face 10A by the cam pressing pin 613 of the first eject arm 61 as described above.

A rack 711 is provided on the left-wall-10B side of the first shift cam 71 near the front face 10A. The rack 711 is capable of engagement with the pinion gear 425B of the cam shift gear 425. When the first shift cam 71 is pressed by the cam pressing pin 613 toward the front face 10A, the rack 711 is engaged with the pinion gear 425B, so that the first shift cam 71 is capable of advancement and retraction in front-and-back direction by the drive force from the drive unit 40.

A gap of more thickness than that of the large-diameter shift gear 425A and the shift drive branch gear 422 is provided between the bottom face of the casing body 11 and the front-face-10A side of the first shift cam 71. Further, the top side of the first shift cam 71 is provided at a position closer to the bottom face of the casing body 11 than the top-side periphery of the stepped wall 13. Accordingly, when the first shift cam 71 is moved toward the front face 10A, the front-face-10A side end of the first shift cam 71 moves in the top-side space of the large-diameter shift gear 425A and the shift drive branch gear 422 and the bottom-side space of the roller drive branch gear 423 and the second transmission gear 424, thereby preventing the interference against the large-diameter shift gear 425A, the shift drive branch gear 422, the roller drive branch gear 423 and the second transmission gear 424.

Further, a cam groove 712 opposed to the top side is provided on the rear-face-10D side of the first shift cam 71. The cam groove 712 includes a standby groove 712A, an 8 cm-disc cam groove 712B, a 12 cm-disc cam groove 712C and a cam groove 712D. The standby groove 712A is a groove provided on the front-face-10A side of the cam groove 712, which is longitudinal in right-and-left direction. The 8 cm-disc cam groove 712B is a groove continuous with the standby groove 712A to extend from the right-wall-10C side of the standby groove 712A toward the rear face 10D. The 12 cm-disc cam groove 712C is a groove continuous with the standby groove 712A to extend from the left-wall-10B side of the standby groove 712A toward the rear face 10D side. The clamp groove 712D is a groove continuous with the 8 cm-disc cam groove 712B and the 12 cm-disc cam groove 712C to extend along the left-wall-10B side of the first shift cam 71 toward the rear-face. The cam control pin 555 of the link plate 55 is inserted into the cam groove 712.

A first pressing wall 713 that rises toward the top side is provided on the left-wall-10B side of the first shift cam 71 near the rear face 10D. As described above, the first pressing wall 713 is capable of being contacted with the cam pressing pin 613 of the first eject arm 61. When a large-diameter disc 1A is inserted, the large-diameter disc 1A is pressed toward the front face 10A by the cam pressing pin 613.

The select arm 73 is rotatably attached to the first pressing wall 713 near the right wall 10C. The select arm 73 includes a pressing piece 732 extending toward the rear face 10D and a plate engaging piece 733 that extend toward the front face 10A that are provided around a rotary shaft 731. A spring mount 734 is provided on a rear-face side of the select arm 73. A spring (biasing unit in the present invention) is provided between the spring mount 734 and the spring mount 714 provided on the first shift cam 71, so that the select arm 73 is constantly biased clockwise.

The pressing piece 732 is provided with a second pressing wall 735 on an end near the rear face 10D. In the same manner as the first pressing wall 713, the cam pressing pin 613 is capable of being contacted with the second pressing wall 735, which is pressed toward the front face 10A when a small-diameter disc 1B is inserted.

The distal end of the plate engaging piece 733 is curved toward the left wall 10B to provide a pin engaging portion 733A adapted for the select pin 554 of the link plate 55 to be engaged (see FIG. 3). The pin engaging portion 733A corresponds to a control member engaging unit of the present invention. When the link plate 55 is located near the right wall 10C (initial state), the select pin 554 is engaged with the pin engaging portion 733A of the plate engaging piece 733 to restrict the rotation of the select arm 73. On the other hand, when a large-diameter disc 1A is inserted and the link plate 55 is shifted toward the left wall 10B, the select pin 554 is separated from the pin engaging portion 733A to allow clockwise rotation of the select arm 73. Accordingly, the cam pressing pin 613 of the first eject arm 61 is capable of being contacted with the first pressing wall 713.

As shown in FIG. 4, a clamper elevating groove 715 is provided on the first shift cam 71 near the left wall 10B. A clamper elevating pin 21C projecting from the base 21 toward the right wall 10C is engaged with the clamper elevating groove 715, where the clamper elevating pin 21C is moved to elevate the base 21 in accordance with the advancement and the retraction of the first shift cam 71. The total movement stroke of the first shift cam 71 from the rear-face-10D side to the front-face-10A side can be invested in the control of the pivotal movement of the disc processor 20, i.e. the elevation of the clamper. Accordingly, the range capable of providing the clamper elevating groove 715 can be widened. The clamper elevating groove 715 includes an escape section 715A, a standby section 715B, a clamp section 715C and an in-play section 715D, which are consecutively provided.

The escape section 715A is provided on the front-face-10A side of the clamper elevating groove 715. The escape section 715A extends in front-and-back direction at a height nearest to the bottom face of the casing 10.

The standby section 715B is provided on the rear-face-10D side of the escape section 715A at a height capable of information-processing of the optical disc 1 by the disc processor 20. At the standby section 715B, the position of the centerhole of the optical disc 1 is adjusted with the turntable 23.

The clamp section 715C is a chevron-shaped groove protruding toward the top side. When the clamper elevating pin 21C is engaged with the clamp section 715C, the base 21 is moved toward the top face to bring the turntable 23 into contact or closer to a clamp member (not shown) provided on the top face. At this time, the optical disc 1 held by the loading arm 51, the disc guide arm 53, the first eject arm 61 and the second eject arm 62 is pressed toward the turntable 23. Accordingly, the optical disc 1 is sandwiched between the clamp member and the turntable 23 and the centerhole of the optical disc 1 is engaged with the disc engaging portion 23A of the turntable 23. Further, the claw members are engaged with the centerhole to chuck the optical disc 1 onto the turntable 23.

The in-play section 715D is provided on the rear-face-10D side of the clamp section 715C substantially at the same height as the standby section 715B, i.e. at a height capable of processing information on the optical disc 1 by the disc processor 20. When the clamper elevating pin 21C is engaged with the in-play section 715D, the information on the optical disc 1 can be processed by the information processor 24 (playable state).

A fourth switch SW4 mounted on the control circuit 80 disposed on, for instance, the bottom face is provided near the rear face 10D of the first shift cam 71. The fourth switch SW4 detects the pivotal movement of the disc processor 20. Specifically, the fourth switch SW4 detects the moving condition of the first shift cam 71 for pivotally moving the disc processor 20 to detect the pivotal movement of the disc processor 20.

Similarly to the switches SW1, SW2 and SW3, the fourth switch SW4 is coupled with the control circuit 80, which includes a switch body and a movable piece. In initial state, the movable piece is pressed by the left-wall-10B side of the first shift cam 71. When the first shift cam 71 is moved toward the front face 10A, the movable piece of the fourth switch SW4 protrudes to establish OFF state (H level). As described, the control circuit 80 recognizes switching of the forth switch SW4 between the ON/OFF states (L/H levels) to recognize the detecting state of the fourth switch SW4.

The second shift cam slides in right-and-left direction in conjunction with the movement of the first shift cam 71. Specifically, when the first shift cam 71 is moved toward the front face 10A, the second shift cam is moved toward the left wall 10B. When the first shift cam 71 is moved toward the rear face 10D, the second shift cam moves toward the right wall 10C. A clamper elevating groove (not shown) having the same shape as the clamper elevating groove 715 of the first shift cam 71 is provided on the front-face-10A side of the second shift cam. A clamper elevating pin 21C (not shown) protruding from the base 21 toward the rear face 10D is engaged into the clamper elevating groove. The second shift cam moves right-and-left direction to pivotally move the disc processor 20 in the same manner as the first shift cam 71.

[Operation of Disc Device]

Next, an operation of the disc device will be described below with reference to drawings.

Figure 5:
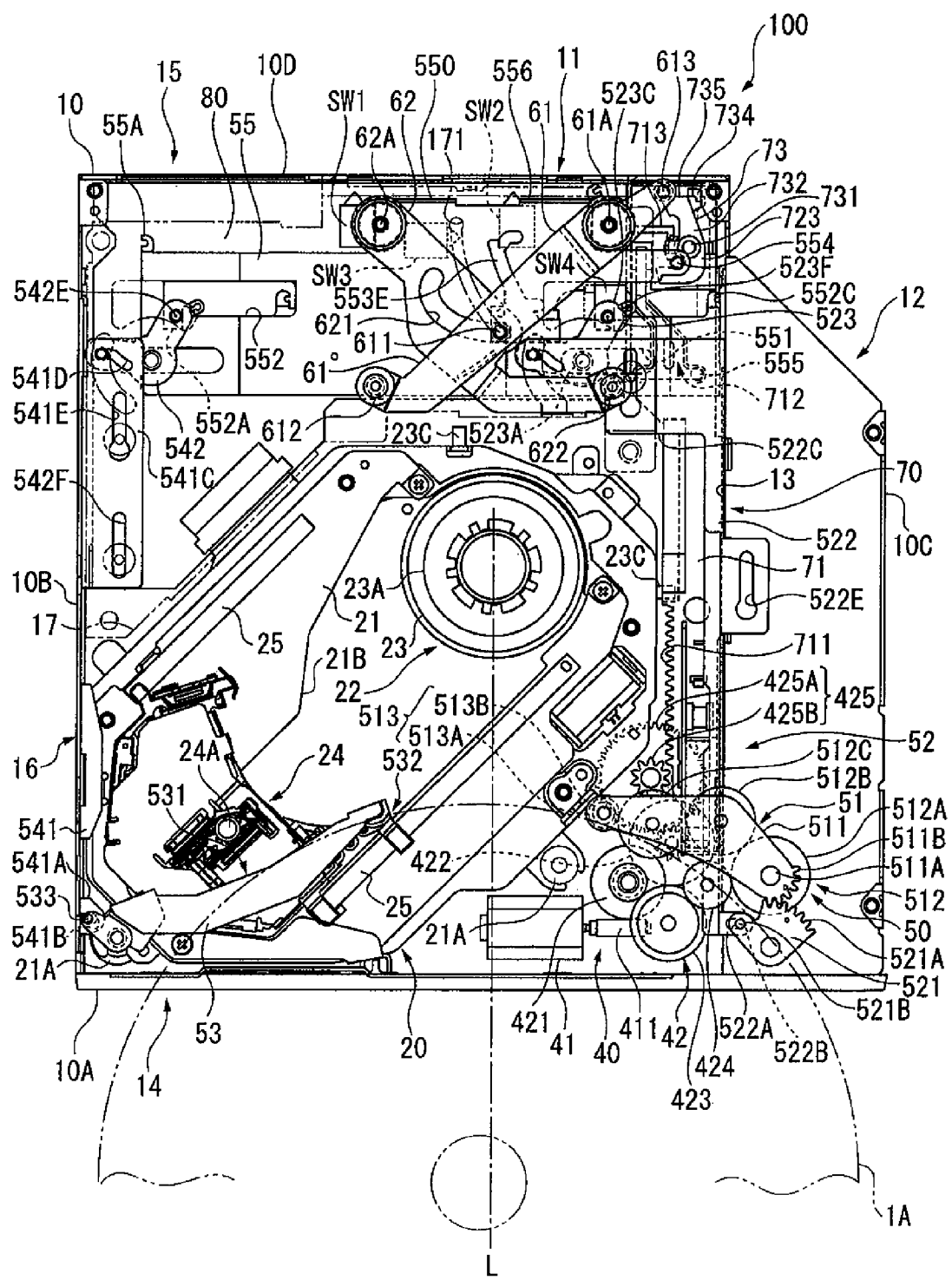
FIG. 5 is a top view showing the inside of the disc device when a large-diameter disc is to be inserted.
Figure 6:
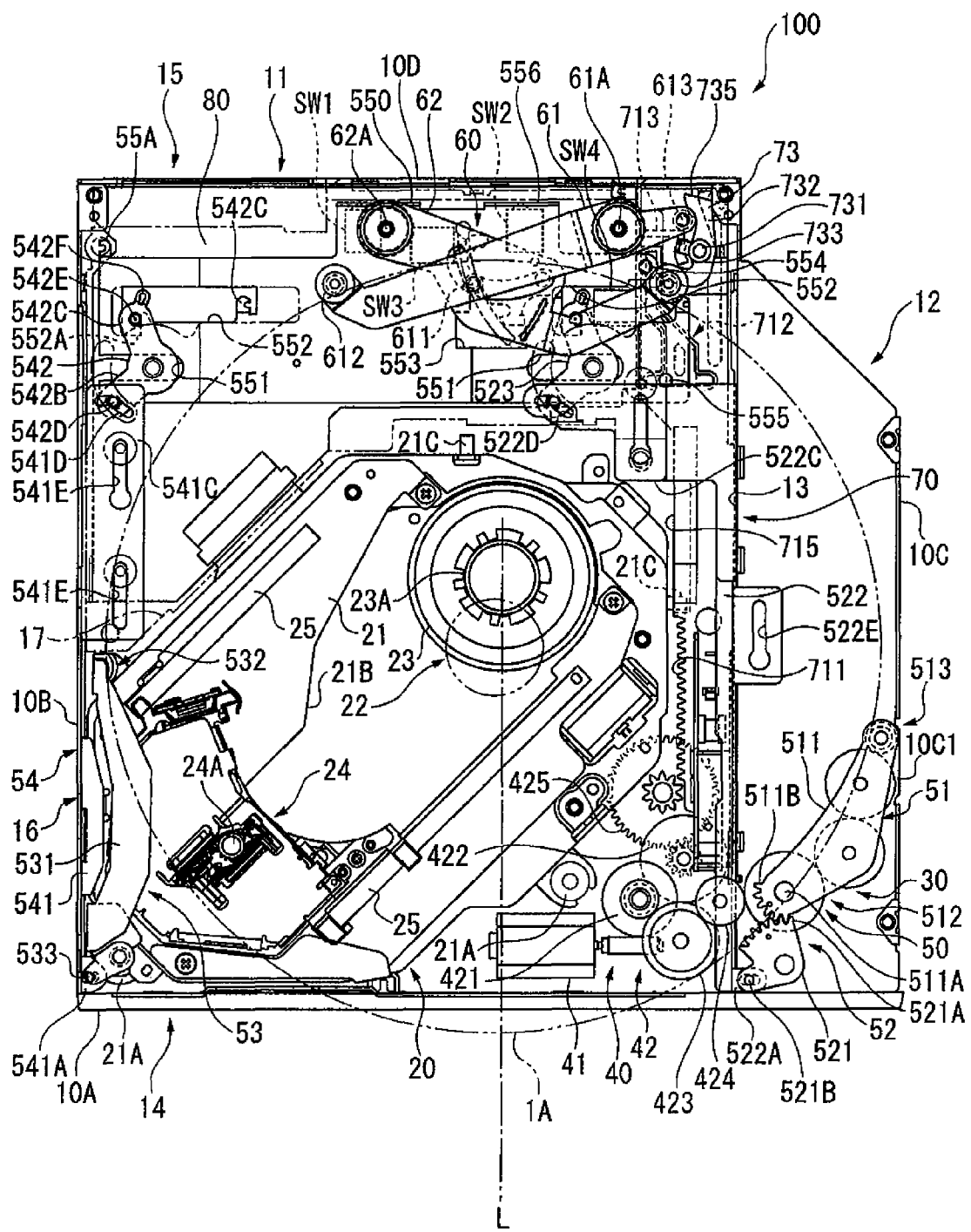
FIG. 6 is a top view showing the inside of the disc device while the large-diameter disc is being transferred.
Figure 7:
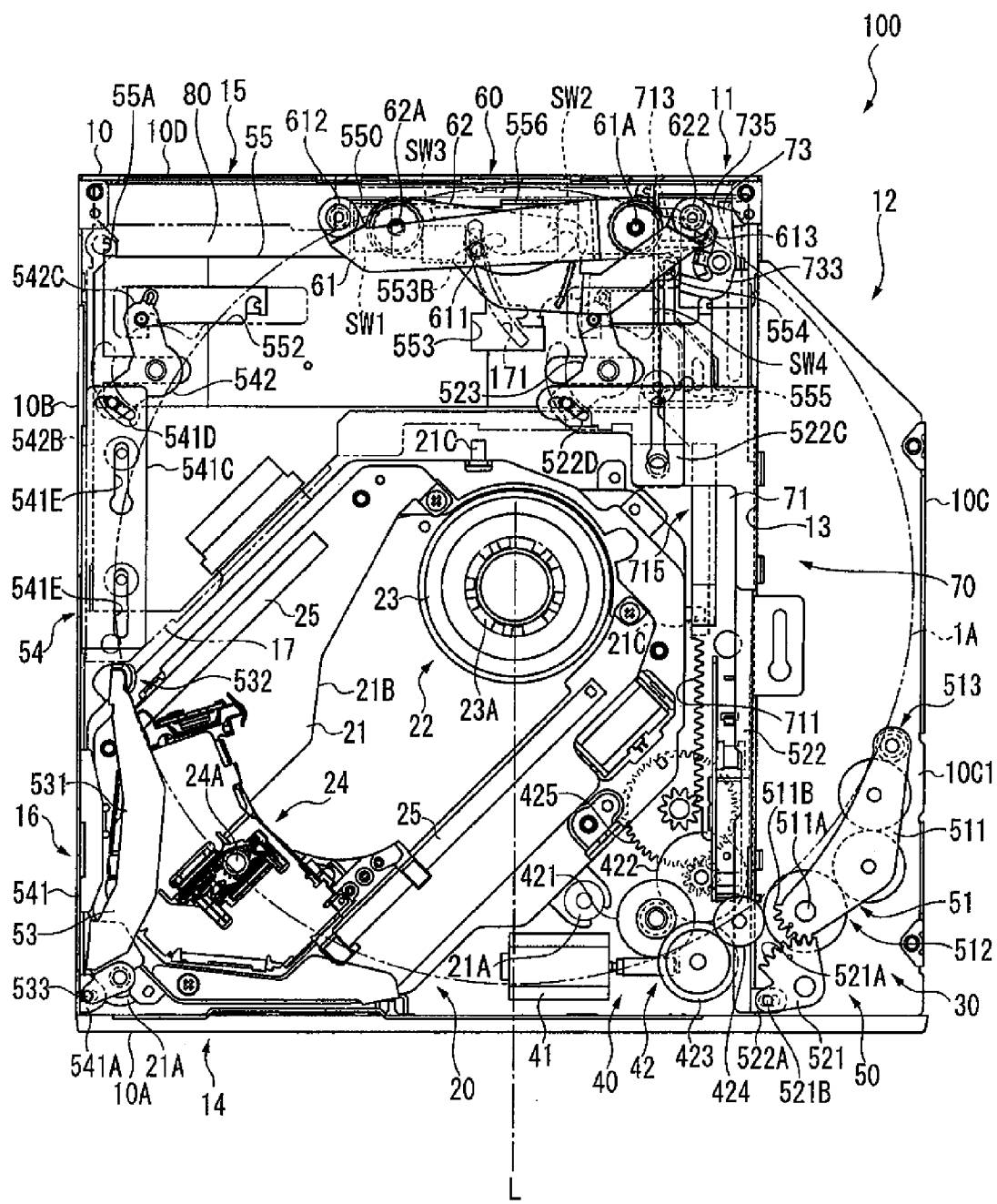
FIG. 7 is a top view showing the inside of the disc device when the large-diameter disc has been loaded.
Figure 8:
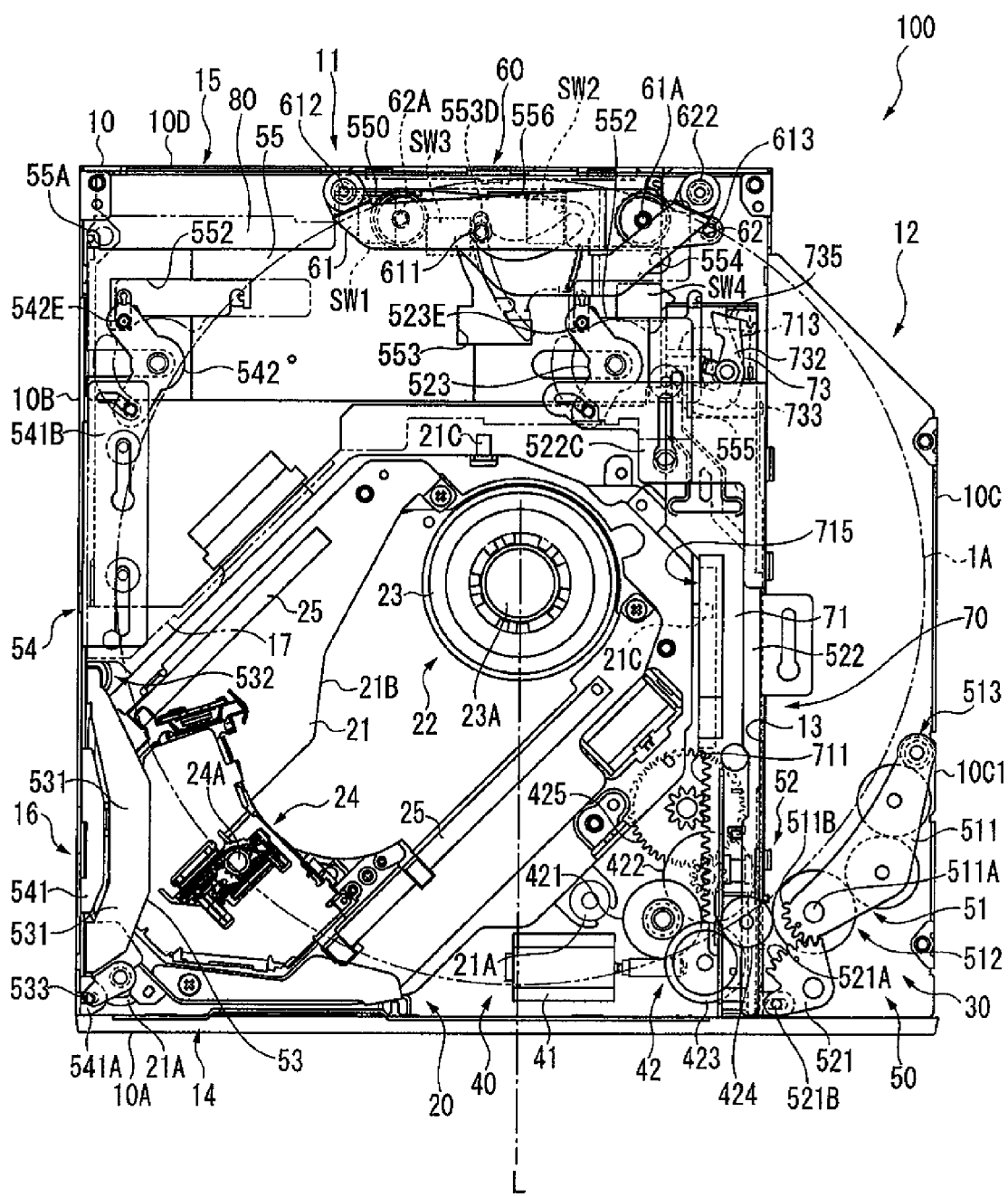
FIG. 8 is a top view showing the inside of the disc device when the large-diameter disc has been clamped.
Figure 9:
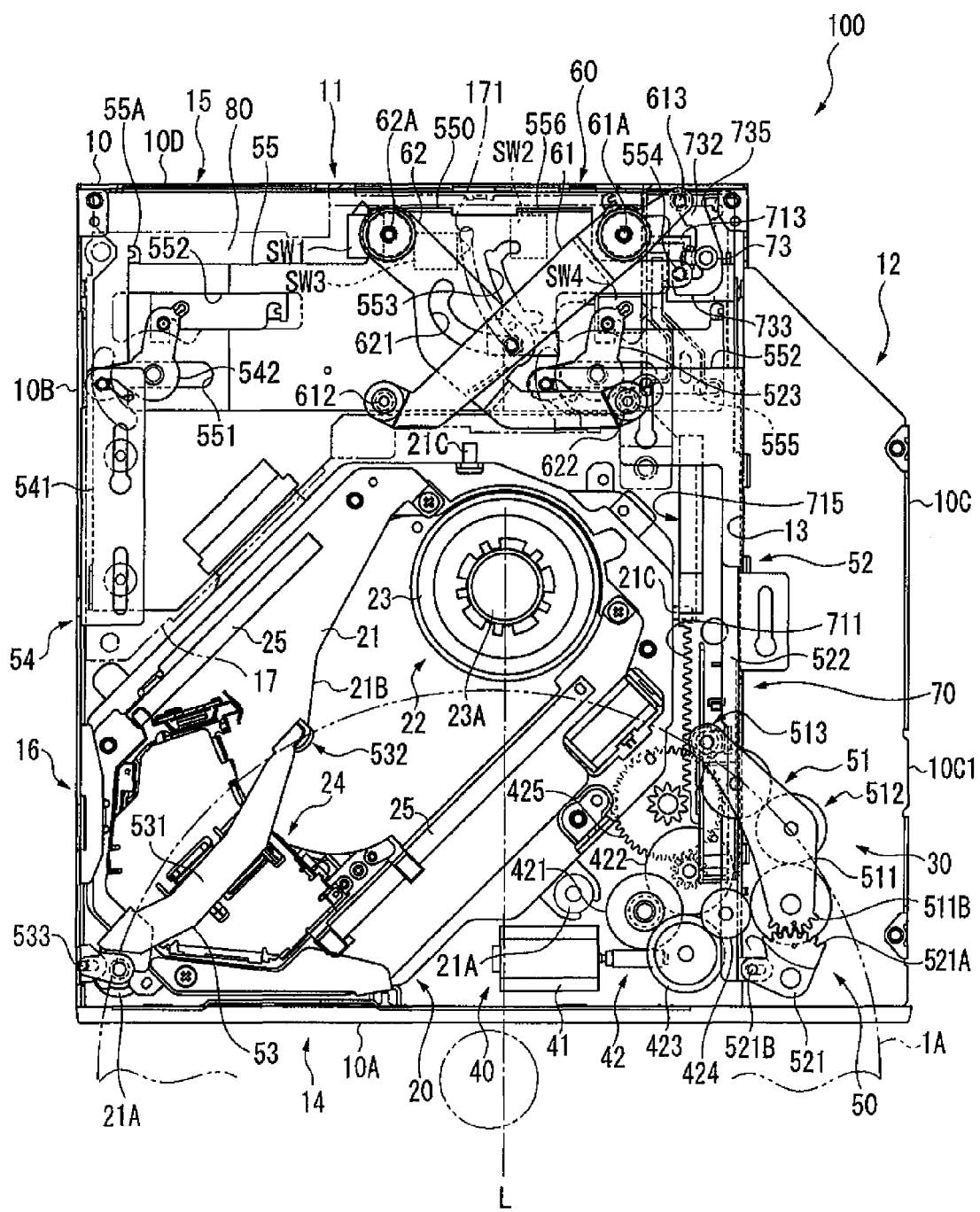
FIG. 9 is a top view showing the inside of the disc device when the large-diameter disc has been unloaded.
Figure 10:
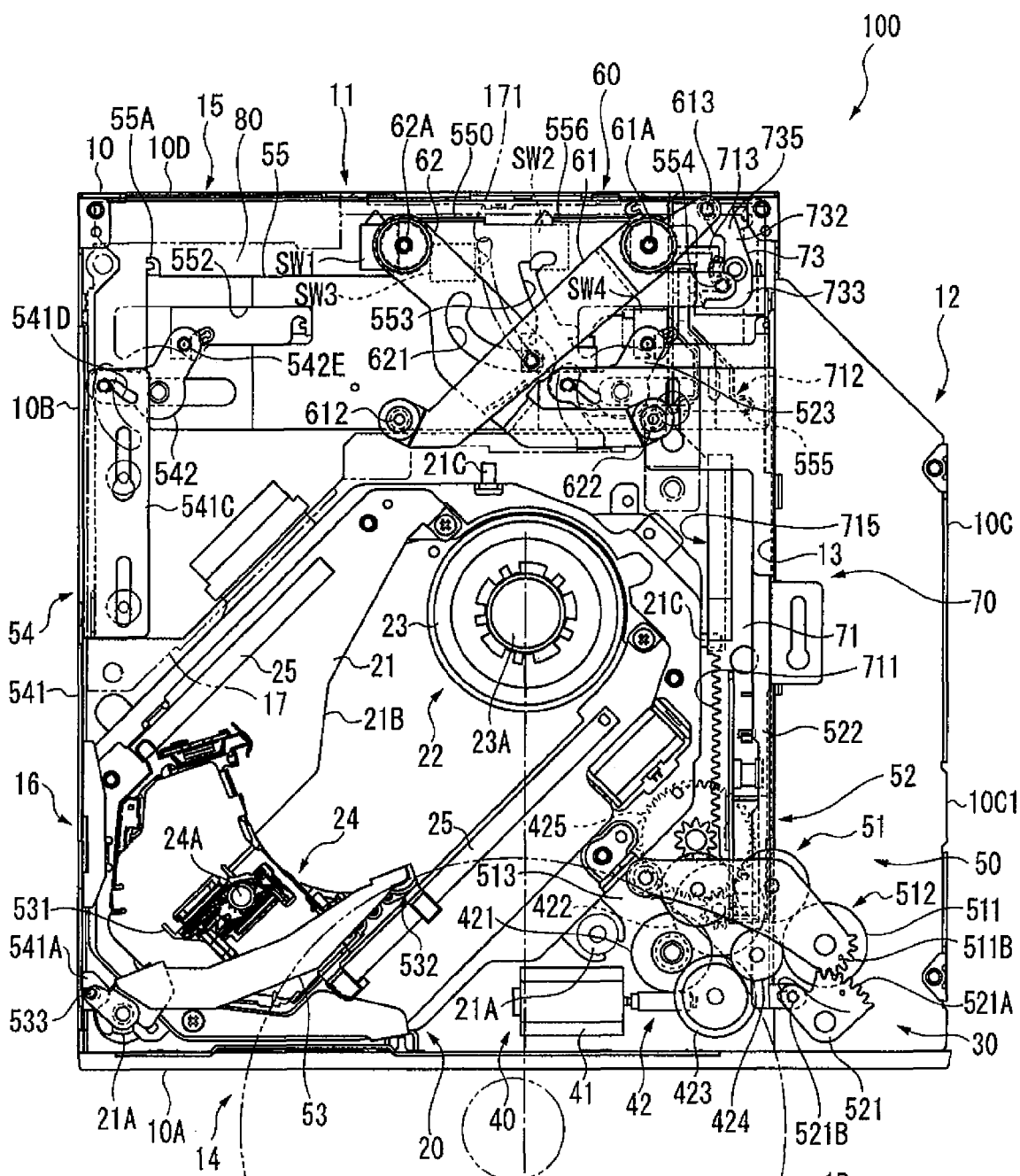
FIG. 10 is a top view showing the inside of the disc device when a small-diameter disc is to be loaded and when the small-diameter disc has been unloaded.
Figure 11:
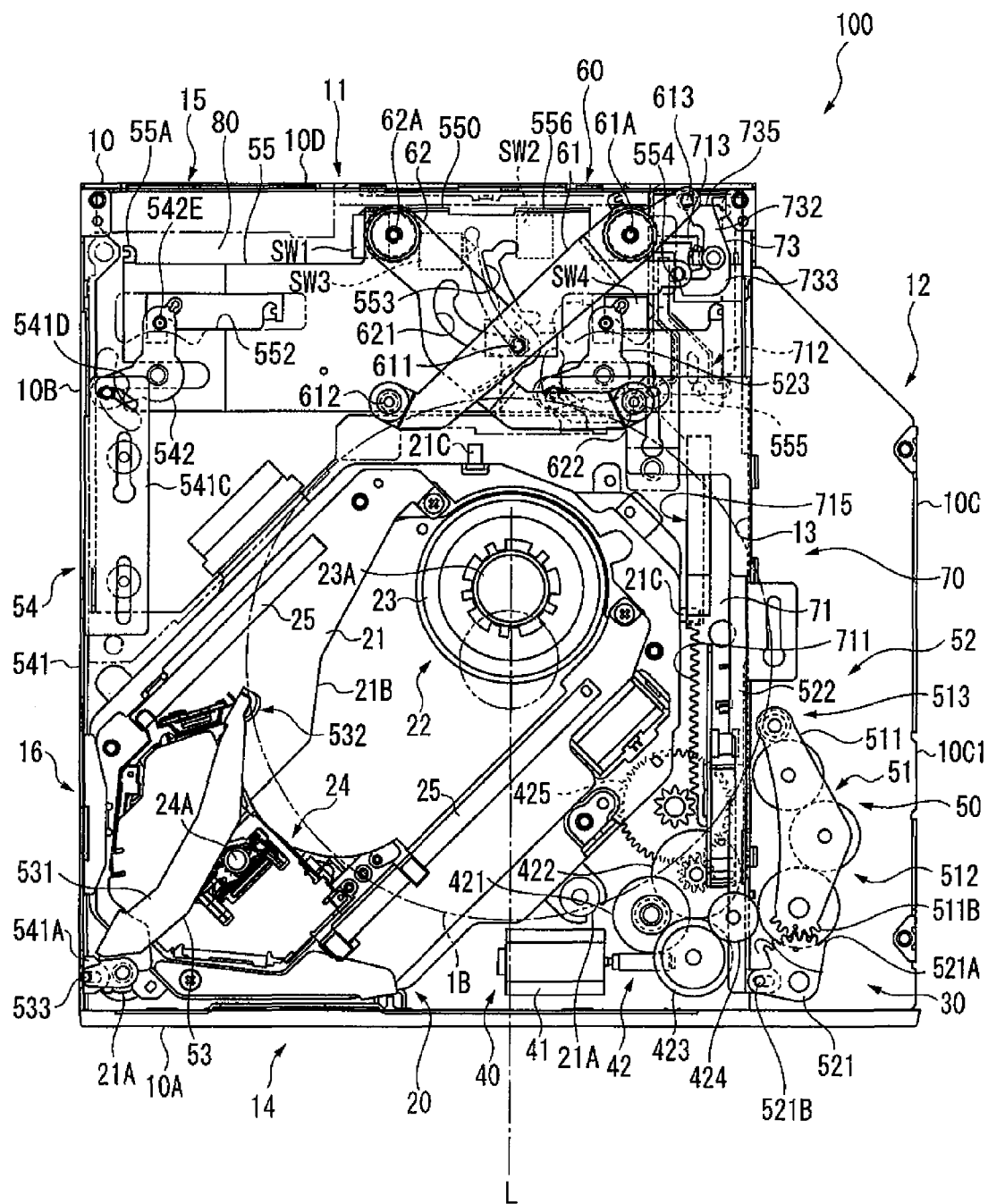
FIG. 11 is a top view showing the inside of the disc device while the small-diameter disc is being transferred.
Figure 12:
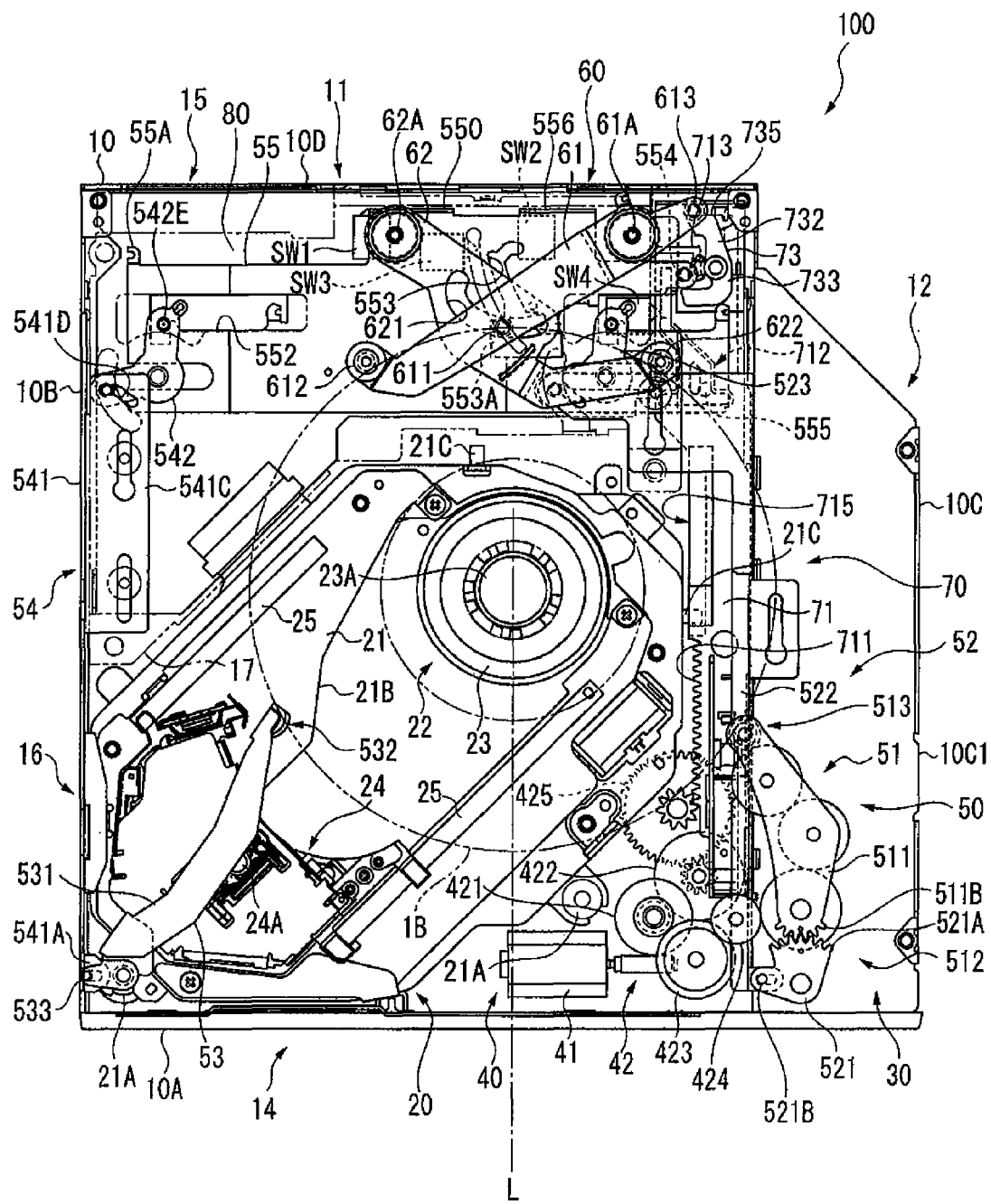
FIG. 12 is a top view showing the inside of the disc device when the small-diameter disc has been loaded.
Figure 13:
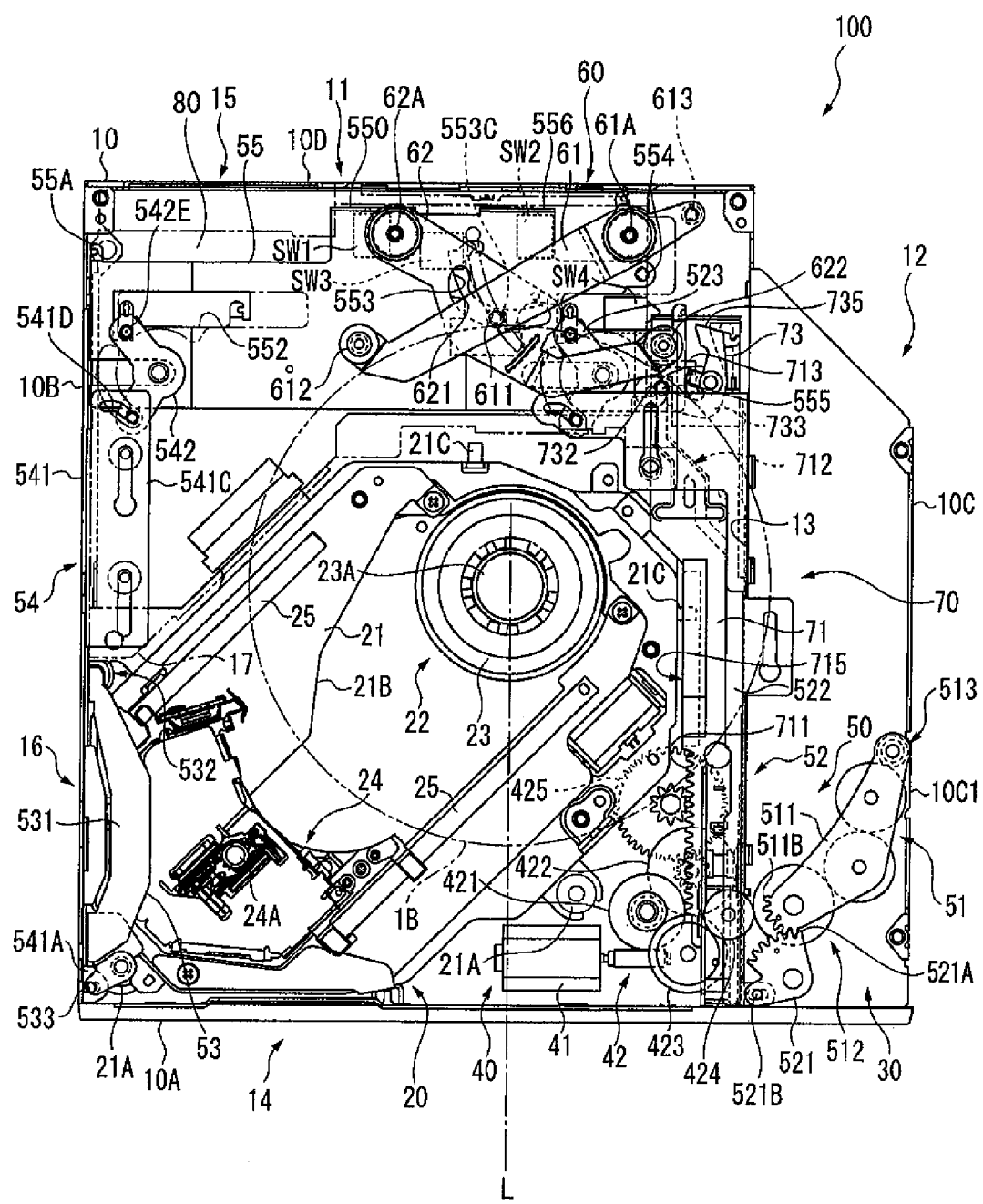
FIG. 13 is a top view showing the inside of the disc device when the small-diameter disc has been clamped.
Figure 14:
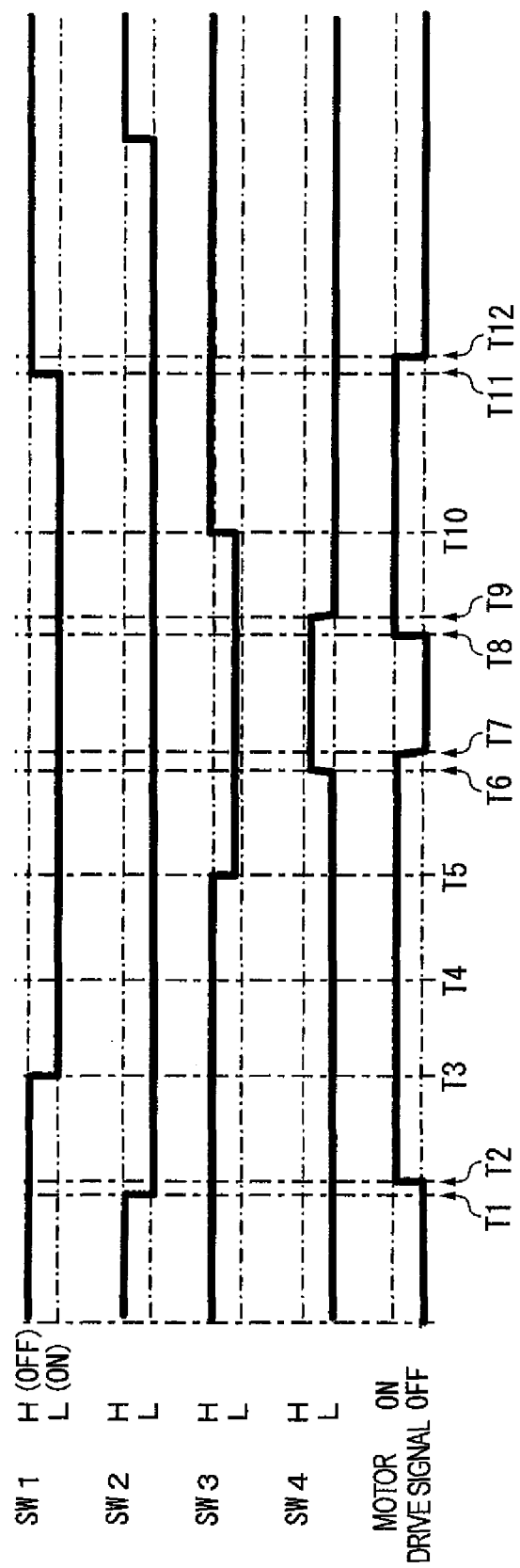
FIG. 14 is a timing chart of a first to a fourth switches in accordance with progress in transfer of the large-diameter disc.

FIG. 5 is a top view showing the inside of the disc device when a large-diameter disc is to be inserted. FIG. 6 is a top view showing the inside of the disc device while the large-diameter disc is being transferred. FIG. 7 is a top view showing the inside of the disc device when the large-diameter disc is completely loaded. FIG. 8 is a top view showing the inside of the disc device when the large-diameter disc has been clamped. FIG. 9 is a top view showing the inside of the disc device when the large-diameter disc has been unloaded. FIG. 10 is a top view showing the inside of the disc device when a small-diameter disc is to be loaded and when the small-diameter disc has been unloaded. FIG. 11 is a top view showing the inside of the disc device while the small-diameter disc is being transferred. FIG. 12 is a top view showing the inside of the disc device when the small-diameter disc has been loaded. FIG. 13 is a top view showing the inside of the disc device when the small-diameter disc has been clamped. FIG. 14 is a timing chart of a first to a fourth switches in accordance with progress in transfer of the large-diameter disc. FIG. 1S is a timing chart of a first to a fourth switches in accordance with progress in transfer of the small-diameter disc.

(Loading of Large-Diameter Disc)

Initially, loading operation(s) when a large-diameter disc 1A is inserted into the disc device 100 will be described below.

As shown in FIG. 5, when a large-diameter disc 1A is inserted through the insertion-and-ejection opening 14 of the disc device 100 during the initial state, a periphery of the large-diameter disc 1A is brought into contact with the roller 513 of the loading arm 51 and the disc guide 532 of the disc guide arm 53. In this state, when the large-diameter disc 1A is further inserted toward the rear face 10D, the loading arm 51 is rotated toward the right wall 10C and the disc guide arm 53 is rotated toward the left wall 10B. Accordingly, the link plate 55 is also slid toward the left wall 10B in conjunction with the rotation of the loading arm 51 and the disc guide arm 53.

When the switch piece 556 of the link plate 55 is brought into contact with the movable piece of the second switch SW2 to turn the second switch SW2 into ON state (L level) (T1 in FIG. 14), the control circuit 80 of the disc device 100 controllably drives the drive motor 41 of the drive unit 40. Then, the drive force of the drive motor 41 is transmitted to the roller 513 of the loading arm 51, so that the roller 513 is rotated in a direction for the large-diameter disc 1A to be loaded into the inside of the casing 10 (T2 in FIG. 14).

Further, the loading arm 51 and the disc guide arm 53 guide the transfer of the large-diameter disc 1A with the roller 513 and the disc guide 532 while the center of the centerhole of the large-diameter disc 1A is slightly shifted leftward relative to the centerline L. While the roller 513 and the disc guide 532 hold the largest-diameter section of the large-diameter disc 1A, the loading arm 51 and the disc guide arm 53 are respectively rotated nearest to the right wall 10C and the left wall 10B. At this time, the right-wall-10C side of the roller 513 is inserted into the escape hole provided on the right wall 10C to avoid interference between the roller 513 and the right wall 10C.

Subsequently, when the large-diameter disc 1A is further loaded into the casing 10 manually or by the drive force of the roller 513, the insertion tip end of the large-diameter disc 1A is in contact with the first disc abutment portion 612 of the first eject arm 61. Then, when the large-diameter disc 1A is further transferred toward the rear face 10D by the roller 513, the first eject arm 61 is rotated. At this time, the large-diameter disc 1A is transferred while being held between the first disc abutment portion 612 of the first eject arm 61 and the second disc abutment portion 622 of the second eject arm 62, so that the center of the centerhole of the large-diameter disc 1A is moved on the centerline L of the disc device 100.

When the large-diameter disc 1A is further moved toward the rear face 10D, the link plate 55 is further moved toward the left wall 10B. Accordingly, as shown in FIG. 6, the switch piece 550 is in contact with the movable piece of the first switch SW1 to turn the first switch SW1 into ON state (L level) (T3 in FIG. 14).

Subsequently, when the large-diameter disc 1A is further inserted, the eject pin 611 is engaged with the large-diameter restricting/engaging portion 553B to restrict the movement of the first eject arm 61. Further, when the large-diameter disc 1A is inserted, since the loading arm 51 and the disc guide arm 53 are respectively rotated toward the right wall 10C and the left wall 10B, the link plate 55 is also greatly moved toward the left wall 10B. Accordingly, the select pin 554 of the link plate 55 is disengaged from the pin engaging portion 733A of the select arm 73 to allow the clockwise rotation of the select arm 73. Accordingly, the cam pressing pin 613 of the first eject arm 61 is not in contact with the second pressing wall 735 of the select arm 73 but is rotated to contact with the first pressing wall 713. Further, the cam control pin 555 is moved to the interconnection between the standby groove 712A and the 12 cm-disc cam groove 712C of the cam groove 712 in accordance with the movement of the link plate 55.

Then, when the large-diameter disc 1A is completely loaded and is moved above the turntable 23 as shown in FIG. 7 (T4 in FIG. 14), the cam pressing pin 613 pushes the first pressing wall 713 toward the front face 10A. Accordingly, the first shift cam 71 is moved toward the front face 10A to engage the rack 711 with the pinion gear 425B of the cam shift gear 425. Then, the first shift cam 71 is moved toward the front face 10A by the drive force transmitted from the drive unit 40 to start clamping operation.

The clamping operation is effected by moving the clamper elevating pin 21C of the base 21 within the clamper elevating groove 715 in the first shift cam 71 in accordance with the movement of the first shift cam 71. Specifically, when the first shift cam 71 is about to be moved, the clamper elevating pin 21C is located at the escape section 715A, where the base 21 is positioned near the bottom side of the casing 10 corresponding to the height of the escape section 715A.

When the first shift cam 71 is moved toward the front face 10A from this state, the clamper elevating pin 21C is moved toward the standby section 715B. Accordingly, the elevation of the base 21 is stopped at the height corresponding to the standby section 715B, where the position adjustment between the centerhole of the optical disc 1 and the disc engaging portion 23A of the turntable 23 is conducted.

When the first shift cam 71 is further moved toward the front face 10A, the clamper elevating pin 21C is moved to the clamp section 715C. Accordingly, the base 21 is moved toward the top face to hold the large-diameter disc between the turntable 23 and the clamp member provided on the top face and engage the disc engaging portion 23A with the centerhole of the large-diameter disc 1A to finish the clamping operation. Subsequently, when the clamper elevating pin 21C is moved to the in-play section 715D, the base 21 is moved to a height capable of processing the information on the large-diameter disc 1A by the information processor 24 as shown in FIG. 8.

During the clamping operation, the cam control pin 555 moves through the 12 cm-disc cam groove 712C to the clamp groove 712D. Accordingly, the link plate 55 is further moved toward the left wall 10B and the eject pin 611 is moved from the large-diameter restricting/engaging portion 553B toward the large-diameter spacing/engaging portion 553D. Specifically, the first and the second eject arms 61, 62 are rotated toward the rear face 10D so that the first and the second disc abutment portions 612, 622 are separated from the periphery of the large-diameter disc 1A. At this time, the eject pin 611 turns the third switch SW3 provided on the bottom side of the eject arm restricting groove 171 into ON state (L level) (T5 in FIG. 14).

The loading arm 51 and the disc guide arm 53 are respectively rotated near to the right wall 10C and the left wall 10B in accordance with the movement of the link plate 55, so that the roller 513 and the disc guide portion 532 are spaced apart from the periphery of the large-diameter disc 1A.

Subsequently, when the first shift cam 71 is further moved toward the front face 10A, the movable piece of the fourth switch SW4 and the end surface of the first shift cam 71 are separated to turn the fourth switch into OFF state (H level) (T6 in FIG. 14). Accordingly, the control circuit 80 recognizes the completion of the clamping operation of the large-diameter disc 1A to stop the drive motor 41 (T7 in FIG. 14). At this time, the control circuit 80 determines the diameter of the optical disc 1 based on the condition of the third switch SW3 and the fourth switch SW4. Specifically, if the third switch SW3 is ON state (L level) when the fourth switch SW4 is turned into OFF state (H level), the control circuit 80 judges that the inserted optical disc 1 is the large-diameter disc 1A. In contrast, though described later in detail, if the third switch SW3 is OFF state (H level) when the fourth switch SW4 is turned into OFF state (H level), the control circuit 80 judges that the inserted optical disc 1 is a small-diameter disc 1B.

Then, the control circuit 80 controls the drive of the information processor 24 of the disc processor 20 to conduct writing processing for writing information onto the large-diameter disc 1A and reading processing for reading the information stored in the large-diameter disc 1A.

(Unloading of Large-Diameter Disc)

Next, operation(s) of unloading a large-diameter disc 1A will be described.

When the control circuit 80 of the disc device 100 recognizes an input signal for unloading the large-diameter disc 1A inputted by pressing an eject button (not shown) and the like, the control circuit 80 conducts operation(s) for unloading the large-diameter disc 1A toward the outside of the casing 10. Specifically, the control circuit 80 initially controllably drives the drive motor 41.

During the unloading operation, the control circuit 80 initially drives the drive motor 41 of the drive unit 40 (T8 in FIG. 14) to move the first shift cam 71 toward the rear face 10D. The fourth switch SW4 is turned into ON state (L level) in accordance with the movement of the first shift cam 71 toward the rear face 10D (T9 in FIG. 14).

Further, the cam control pin 555 moves within the cam groove 712 in accordance with the movement of the first shift cam 71 toward the rear face 10D to move the link plate 55 toward the right wall 10C. Accordingly, the loading arm 51, the disc guide arm 53 and the first and the second eject arms 61, 62 are rotated in conjunction with the link plate 55, so that the optical disc 1 is held by the roller 513, the disc guide 532 and the first and the second disc abutment portions 612, 622. At this state, the third switch SW3 is turned into OFF state (H level) (T10 in FIG. 14).

When the first shift cam 71 is further moved toward the rear face 10D in this state, since the base 21 is moved toward the bottom side, the large-diameter disc 1A is disengaged from the turntable 23.

Subsequently, the large-diameter disc 1A is transferred toward the front face 10A by virtue of the drive of the roller 513 of the loading arm 51 and the biasing force of the first and the second eject arms 61, 62 to be ejected from the insertion-and-ejection opening 14. Further, as shown in FIG. 9, when the link plate 55 is moved toward the right wall 10C to turn the first switch SW1 into OFF state (H level) (T11 in FIG. 14), the control circuit 80 stops the drive motor 41 (T12 in FIG. 14) to stop driving the roller 513.

(Loading of Small-Diameter Disc)

Next, loading operation(s) when a small-diameter disc 1B is inserted into the disc device 100 will be described below. As shown in FIG. 10, when the small-diameter disc 1B is inserted through the insertion-and-ejection opening 14 of the disc device 100 during the initial state, a periphery of the small-diameter disc 1B is brought into contact with the roller 513 of the loading arm 51 and the disc guide 532 of the disc guide arm 53. In this state, when the small-diameter disc 1B is further inserted toward the rear face 10D, the loading arm 51 is rotated toward the right wall 10C and the disc guide arm 53 is rotated toward the left wall 10B. Accordingly, the link plate 55 is also slid toward the left wall 10B in conjunction with the rotation of the loading arm 51 and the disc guide arm 53.

Figure 15:
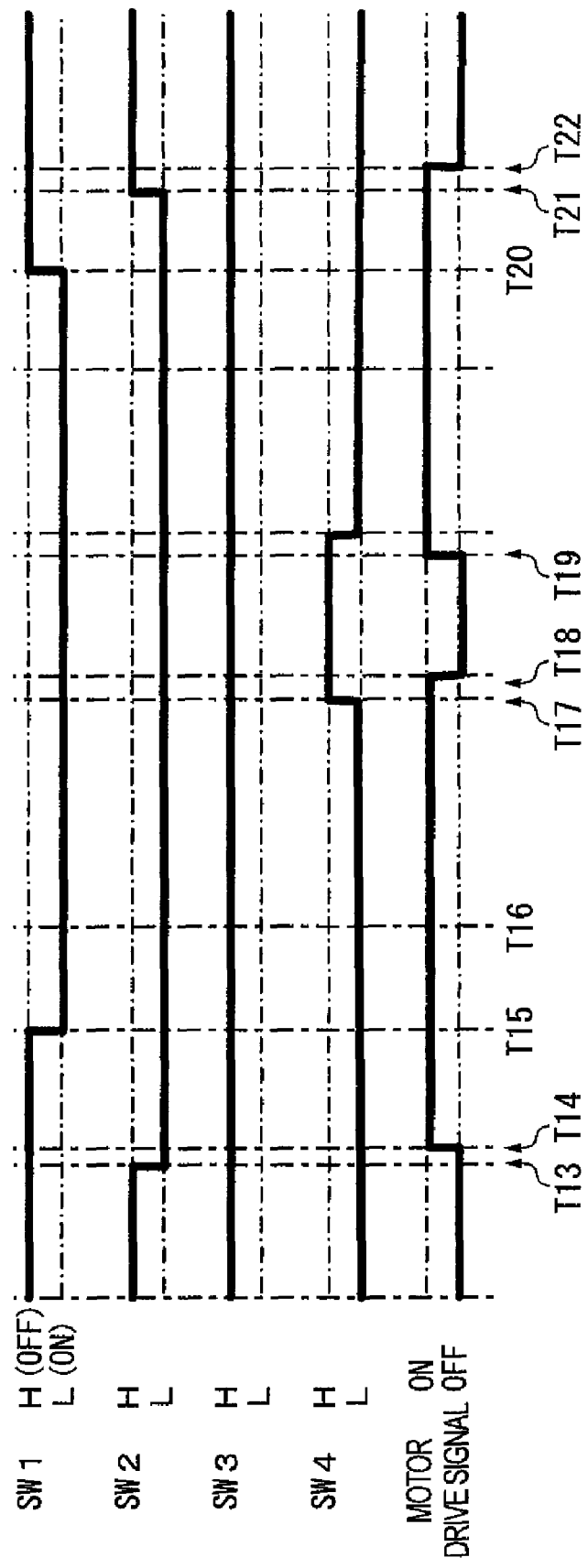
FIG. 15 is a timing chart of a first to a fourth switches in accordance with progress in transfer of the small-diameter disc.

When the switch piece 556 of the link plate 55 is brought into contact with the movable piece of the second switch SW2 to turn the second switch SW2 into ON state (L level) (T13 in FIG. 15), the control circuit 80 of the disc device 100 controllably drives the drive motor 41 of the drive unit 40. Then, the drive force of the drive motor 41 is transmitted to the roller 513 of the loading arm 51, so that the roller 513 is rotated in a direction for the small-diameter disc 1B to be loaded into the inside of the casing 10 (T14 in FIG. 15).

Subsequently, when the small-diameter disc 1B is further loaded into the casing 10 manually or by the drive force of the roller 513, the insertion tip end of the small-diameter disc 1B is in contact with the first disc abutment portion 612 of the first eject arm 61. Then, when the small-diameter disc 1B is further transferred toward the rear face 10D by the roller 513, the first eject arm 61 is rotated. At this time, the small-diameter disc 1B is transferred while being held between the first disc abutment portion 612 of the first eject arm 61 and the second disc abutment portion 622 of the second eject arm 62, so that the center of the small-diameter disc 1B is moved on the centerline L of the disc device 100.

When the small-diameter disc 1B is further moved toward the rear face 10D, the link plate 55 is further moved toward the left wall 10B. Accordingly, as shown in FIG. 11, the switch piece 550 is in contact with the movable piece of the first switch SW1 to turn the first switch SW1 into ON state (L level) (T15 in FIG. 15).

When the small-diameter disc 1B is further moved toward the rear face 10D, the link plate 55 is further moved toward the left wall 10B. Accordingly, as shown in FIG. 11, the switch piece 556 is in contact with the movable piece of the first switch SW1 to turn the first switch SW1 into ON state (L level) (T15 in FIG. 15).

Subsequently, when the small-diameter disc 1B is further inserted, the eject pin 611 is engaged with the small-diameter restricting/engaging portion 553A to restrict the movement of the first eject arm 61. Further, the cam pressing pin 613 of the first eject arm 61 is brought into contact with the second pressing wall 735 of the select arm 73. At this time, the cam control pin 555 is moved to the interconnection between the standby groove 712A and the 8 cm-disc cam groove 712B of the cam groove 712 in accordance with the movement of the link plate 55.

Then, when the small-diameter disc 1B is completely loaded and is moved above the turntable 23 as shown in FIG. 12 (T16 in FIG. 15), the cam pressing pin 613 pushes the first pressing wall 735 toward the front face 10A. Accordingly, the first shift cam 71 is moved toward the front face 10A to engage the rack 711 and the pinion gear 425B of the cam shift gear 425. Then, the first shift cam 71 is moved toward the front face 10A by the drive force transmitted by the drive unit 40 to start clamping operation. Since the clamping operation(s) is the same as that of the large-diameter disc 1A, the description thereof is omitted herein.

During the clamping operation, the cam control pin 555 moves through the 8 cm-disc cam groove 712B to the clamp groove 712D. Accordingly, the link plate 55 is further moved toward the left wall 10B and the eject pin 611 is moved from the small-diameter restricting/engaging portion 553A toward the small-diameter spacing/engaging portion 553C. Specifically, the first and the second eject arms 61, 62 are rotated toward the rear face 10D so that the first and the second disc abutment portions 612, 622 are separated from the periphery of the small-diameter disc 1B.

The loading arm 51 and the disc guide arm 53 are respectively rotated near to the right wall 10C and the left wall 10B in accordance with the movement of the link plate 55, so that the roller 513 and the disc guide portion 532 are spaced apart from the periphery of the small-diameter disc 1B.

Subsequently, when the first shift cam 71 is further moved toward the front face 10A, the movable piece of the fourth switch SW4 and the end surface of the first shift cam 71 are separated to turn the fourth switch SW4 into OFF state (H level) (T17 in FIG. 15) as shown in FIG. 13. Accordingly, the control circuit 80 recognizes the completion of the clamping operation to stop the drive motor 41 (T18 in FIG. 15). At this time, the control circuit 80 determines the diameter of the optical disc 1 based on the condition of the third switch SW3 and the fourth switch SW4 as described above. Specifically, if the third switch SW3 is OFF state (H level) when the fourth switch SW4 is turned into OFF state (H level), the control circuit 80 judges that the inserted optical disc 1 is the small-diameter disc 1B.

Then, the control circuit 80 controls the drive of the information processor 24 of the disc processor 20 to conduct writing processing for writing information onto the small-diameter disc 1B and reading processing for reading the information stored in the small-diameter disc 1B.

(Unloading of Small-Diameter Disc)

Next, operation(s) of unloading the small-diameter disc 1B will be described.

When the control circuit 80 of the disc device 100 recognizes an input signal for unloading the small-diameter disc 1B inputted by pressing an eject button (not shown) and the like, the control circuit 80 conducts operation(s) for unloading the small-diameter disc 1B toward the outside of the casing 10. Specifically, the control circuit 80 initially controllably drives the drive motor 41.

During the unloading operation, in the same manner as the unloading operation of the large-diameter disc 1A, the control circuit 80 initially drives the drive motor 41 of the drive unit 40 (T19 in FIG. 15) to move the first shift cam 71 toward the rear face 10D. The fourth switch SW4 is turned into ON state (L level) in accordance with the movement of the first shift cam 71 toward the rear face 10D (T20 in FIG. 15).

Further, the cam control pin 555 moves within the cam groove 712 in accordance with the movement of the first shift cam 71 toward the rear face 10D to move the link plate 55 toward the right wall 10C. Accordingly, the loading arm 51, the disc guide arm 53 and the first and the second eject arms 61, 62 are rotated in conjunction with the link plate 55, so that the small-diameter disc 1B is held by the roller 513, the disc guide 532 and the first and the second disc abutment portions 612, 622. When the first shift cam 71 is further moved toward the rear face 10D in this state, since the base 21 is moved toward the bottom side, the small-diameter disc 1B is disengaged from the turntable 23.

Subsequently, the small-diameter disc 1B is transferred toward the front face 10A by virtue of the drive of the roller 513 of the loading arm 51 and the biasing force of the first and the second eject arms 61, 62. Incidentally, though the first switch SW1 is turned into OFF state (H level) during the transfer of the small-diameter disc 11B toward the front face 10A (T21 in FIG. 15), since the control circuit 80 has determined that the loaded optical disc 1 is the small-diameter disc 1B during the above-described loading operation, the driving of the drive motor 41 is not stopped here.

Subsequently, when the small-diameter disc 1B is transferred to the front face 10A, the small-diameter disc 1B is ejected through the insertion-and-ejection opening 14. When the second switch SW2 is turned into OFF state (H level) (T22 in FIG. 15), the control circuit 80 stops the drive motor 41 (T23 in FIG. 15) to stop driving the roller 513.

[Effect and Advantage of Disc Unit]

As described above, the disc device 100 of the above exemplary embodiment includes: the casing 10; the disc processor 20 provided with the turntable 23; the spindle motor and the information processor 24 and pivotally supported within the casing 10; the drive unit 40; the transfer unit 30; and the disc clamper 70. The transfer unit 30 holds and transfers the optical disc 1 between the insertion-and-ejection opening 14 and the clamping position of the turntable 23 by driving the drive unit 40. The disc clamper 70 switches drive transmission of the drive unit 40 in accordance with the holding condition of the different-diameter optical disc 1 by the transfer unit 30, and pivotally moves the disc processor 20 so that the turntable 23 is advanced into and retracted from the transfer path of the optical disc 1.

As described above, driving of the single drive unit 40 effects transfer of the optical disc 1 by the transfer unit 30 and pivotal movement of the disc processor 20 by the disc clamper 70. Accordingly, since less number of components are required than a conventional arrangement where independent drive units are required respectively for the transfer unit 30 and the disc clamper 70, the size of the disc device 100 can be reduced. Further, the disc clamper 70 switches the drive transmission of the drive unit 40 in accordance with holding condition of the different-diameter optical disc 1 by the transfer unit 30. Accordingly, the timing for transferring the optical disc 1 and the timing for pivotally moving the disc processor 20 can be suitably adjusted in accordance with the diameter of the optical disc 1. Accordingly, the different-diameter optical disc 1 can be suitably processed while reducing the size of the device.

Further, the disc clamper 70 includes the first shift cam 71 that is engaged with the disc processor 20 and is moved in a predetermined direction by driving the drive unit 40 to pivotally move the disc processor 20, and the select arm 73 that is moved in accordance with the holding condition of the different-diameter optical disc 1 by the transfer unit 30 to switch the drive transmission of the drive unit 40 to the first shift cam 71.

The timing for pivotally moving the disc processor 20 can be adjusted in accordance with the diameter of the optical disc 1 by the mechanical process for moving the first shift cam 71 and the select arm 73, so that the optical disc 1 can be securely clamped onto the turntable 23. Accordingly, without employing a complicated structure where, for instance, information on the diameter of the optical disc 1 is detected by a sensor and electric operation control is conducted based on the information for adjusting the timing, mis-clamping of the different-diameter optical disc 1 can be avoided, thereby suitably conducting disc-processing.

The transfer unit 30 includes the cam pressing pin 613 that presses the first shift cam 71 in front-and-back direction of the first shift cam 71 when the optical disc 1 is transferred to a position at which the optical disc is clamped by the turntable 23. Further, the select arm 73 moves in accordance with the holding condition of the different-diameter optical disc 1 by the transfer unit 30 to switch the pressing position of the first shift cam 71 by the cam pressing pin 613. The first shift cam 71 is arranged so that, when the first shift cam 71 is pushed by the cam pressing pin 613, the drive force from the drive unit 40 is transmitted to start the movement of the first shift cam 71. Specifically, when the first shift cam 71 is pressed by the cam pressing pin 613 toward the front face A, the rack 711 is engaged with the pinion gear 425B, so that the first shift cam 71 is capable of advancement and retraction in front-and-back direction by the drive force from the drive unit 40.

Accordingly, since the select arm 73 moves in accordance with the holding condition of the different-diameter optical disc 1 by the transfer unit 30 to switch the pressing position of the first shift cam 71 by the can pressing pin 613, the clamping operation can be started at conditions respectively corresponding to the different-diameter optical discs 1. Further, since the drive force from the drive unit 40 is not transmitted to the first shift cam 71 until the first shift cam 71 is pushed toward the front face A by the cam pressing pin 613, the first shift cam 71 can be set on standby until a suitable timing corresponding to the diameter of the optical disc 1. Accordingly, the timing for transferring the different-diameter optical disc 1 and the timing for pivotally moving the disc processor 20 can be securely adjusted with a mechanical process.

Further, the disc clamper 70 includes a plurality of pressing walls (713, 735) corresponding to the diameter type of the optical disc 1. The pressing walls are arranged in parallel along the front-and-back direction of the first shift cam 71, with which the cam pressing pin 613 is in contact to push out the first shift cam 71.

Accordingly, with the use of the plurality of pressing walls corresponding to the diameter of the optical disc 1, the position for pushing out the first shift cam 71 by the cam pressing pin 613 can be easily and securely adjusted. Accordingly, mis-clamping of the different-diameter optical disc 1 can be avoided and the optical disc 1 can be suitably clamped.

Especially, the first shift cam 71 includes the first pressing wall 713 with which the cam pressing pin 613 is brought into contact to push out the first shift cam 71. The select arm 73 includes the second pressing wall 735 that advances and retracts clockwise in accordance with the movement of the select arm 73, the second pressing wall being adapted to be in contact with the cam pressing pin 613 to push out the first shift cam 71.

With the use of the first pressing wall 713 and the second pressing wall 735, the position for pushing out the first shift cam 71 can be suitably switched by the cam pressing pin 613 irrespective of which one of the large-diameter disc 1A and the small-diameter disc 1B is inserted. Specifically, the second pressing wall 735 is adapted to be advanced and retracted anticlockwise in accordance with the movement of the select arm 73. Accordingly, when the optical disc 1 is inserted and the cam pressing pin 613 is moved along the moving direction of the first shift cam 71, the second pressing wall 735 can be evacuated from the movement path of the cam pressing pin 613 in accordance with the diameter of the inserted disc. The cam pressing pin 613 can be brought into contact with the first pressing wall 713 or the second pressing wall 735 in accordance with the diameter of the inserted disc, so that the timing for starting the pivotal movement of the disc clamper 70 can be mechanically switched.

The select arm 73 is rotatably provided on the first shift cam 71 so that the second pressing wall 735 is moved toward and away from the first pressing wall 713.

Since the select arm 73 is rotated by the first shift cam 71, the cam pressing pin 613 can be brought into contact with one of the first pressing wall 713 and the second pressing wall 735. Accordingly, only a small movement range of the select arm 73 is required, the size of the disc device 100 can be reduced. Further, since the pushing position of the first shift cam 71 by the cam pressing pin 613 can be switched only by rotating the select arm 73, the optical disc 1 can be securely clamped with a simple structure. Accordingly, the disc device 100 with improved production efficiency, reduced size and secure clamping operation of the optical disc 1 can be provided.

The first pressing wall 713 is provided on the first shift cam 71 near the rear face 10D. The select arm 73 is provided on the first shift cam 71 near the rear face 10D in a movable manner. The second pressing wall 735 is provided nearer to the rear face 10D than the first pressing wall 713 when the select arm 73 is not moved.

Accordingly, when the small-diameter disc 1B is transferred by the transfer unit 30 to the position at which the small-diameter disc 1B is clamped by the turntable 23, the cam pressing pin 613 that is moved from the rear face 10D side toward the front face 10A is in contact with the second pressing wall 735. Further, when the large-diameter disc 1A is transferred by the transfer unit 30 to the position at which the large-diameter disc 1A is clamped by the turntable 23, the select arm 73 is rotated clockwise and the cam pressing pin 613 that moves from the rear face 10D side toward the front face 10A is in contact with the first pressing wall 713. Accordingly, with the use of small and narrow deadspace near the rear face 10D of the casing 10, the timing for pivotally moving the disc processor 20 can be suitably switched.

The transfer unit 30 includes the loading unit 50 and the first eject arm 61 that transfers the optical disc 1 while holding the optical disc 1 in cooperation with the loading unit 50. The cam pressing pin 613 is provided on the base end of the first eject arm 61 in a manner protruding in a direction substantially opposing to the first shift cam 71.

Accordingly, when the first eject arm 71 is rotated in accordance with the loading of the optical disc 1, the cam pressing pin 613 provided on the base end of the first eject arm 61 can push out the first shift cam 71 toward the front face 10A. Thus, the timing for transferring the optical disc 1 and the timing for pivotally moving the disc processor 20 can be suitably adjusted in accordance with the diameter of the optical disc 1. Further, with the use of small and narrow deadspace near the rear face 10D of the casing 10, the timing for pivotally moving the disc processor 20 can be suitably switched.

The transfer unit 30 includes the link plate 55 provided on the rear side of the transfer path within the casing 10 and is moved in right-and-left direction of the first shift cam 71 in conjunction with the transfer movement of the optical disc 1 by the loading unit 50 and the first eject arm 61. The link plate 55 includes the select pin 554 that is engageable with and disengageable from the select arm 73 in accordance with the diameter of the optical disc 1 to control the movement of the select arm 73 when the optical disc 1 is transferred to a position at which the optical disc 1 is held by the turntable 23. The select arm 73 includes the pin engaging portion 733A engageable with the select pin 554.

Accordingly, the movement of the select arm 73 can be controlled with the use of the link plate 55 that is moved in right-and-left direction in conjunction with the rotation of the first eject arm 61. Specifically, the link plate 55 is moved toward the left wall 10B in conjunction with the rotation of the first eject arm 61 toward the rear face 10D. When the inserted optical disc 1 is a large-diameter disc 1A, the select arm 73 can be rotated so that the link plate 55 is moved toward the left wall 10B by a predetermined distance or more to disengage the select pin 554 from the pin engaging portion 733A, thereby bringing the cam pressing pin 613 into contact with the first pressing wall 713. When the inserted optical disc 1 is a small-diameter disc 1B, the link plate 55 is not moved toward the left wall 10B by a predetermined distance, so that the select pin 554 stays being engaged with the pin engaging portion 733A, thereby restricting the rotation of the select arm 73. Accordingly, the movement of the select arm 73 can be controlled in accordance with the transfer timing of the different-diameter optical disc 1, so that the disc clamper 70 can be pivotally moved at a suitable timing.

Further, the select arm 73 is biased by the spring (not shown) wound between the spring mounts 734 and 714 in clockwise direction of the first shift cam 71, Accordingly, when a large-diameter optical disc 1 is inserted, the link plate 55 is moved in intersecting direction by a predetermined distance, so that the select pin 554 is disengaged from the pin engaging portion 733A and the select arm 73 is rotated by the biasing force of the spring, thereby bringing the cam pressing pin 613 into contact with the first pressing wall 713. Thus, the pressing position of the select arm 73 by the cam pressing pin 613 can be securely switched.

The second shift cam for pivotally moving the disc processor 20 is provided on the link plate 55.

Accordingly, the clamper elevating pins 21C provided in pair on the base 21 can be respectively engaged with the first shift cam 71 and the second shift cam to pivotally move the disc clamper 70. Thus, the disc clamper 70 can be pivotally moved in a stable manner.

Modifications of Embodiment

It should be noted that the present invention is not limited to the exemplary embodiments described above, but may include modifications described below within a scope where an object of the present invention can be achieved.

Though the disc device 100 is exemplified as a thin disc device capable of being mounted on a notebook computer and the like, the present invention may be implemented on a relatively large disc device mounted on, for instance, desktop personal computer and the like.

Though a large-diameter disc 1A and a small-diameter disc 1B are capable of being loaded inside the casing 10 for information-processing, other arrangements are possible. For instance, the disc device may be adapted for more number of disc diameters. In this case, the movement of the link plate 55 is controlled in accordance with the respective disc diameters and the rotary angle of the loading arm 51, the disc guide arm 53, and the first and the second eject arms 61, 62 may be appropriately adjusted.

The type of the optical disc 1 may not be the pair of the large-diameter disc 1A and the small-diameter disc 1B, but more types of optical disc 1 may be used. In this case, the pressing walls (first pressing wall, second pressing wall, third pressing wall . . . ) capable of being in contact with the cam pressing pin 613 may be provided corresponding to the respective optical disc 1 in order to move the select arm 73. According to the above arrangement, a disc device capable of suitably processing more-than-two diameter optical disc can be provided.

Though the select arm 73 (moving unit) is rotatably provided on the first shift cam 71, other arrangement is possible. Specifically, a plurality of pressing walls corresponding to the different-diameter optical discs may be arranged in parallel on the first shift cam 71, where the cam pressing pin 613 is brought into contact with the moving unit to move the moving unit to push out a predetermined one of the plurality of pressing walls. According to the above arrangement, the different-diameter optical disc 1 can also be suitably processed while reducing the size of the device as in the above embodiment. In other words, any arrangement is possible as long as the position for pushing the first shift cam 71 by the cam pressing pin 613 in conjunction with the movement of the moving unit is changed in accordance with the diameter of the optical disc.

Alternatively, the loading arm 51 may not be moved in conjunction with the disc guide arm 53. In this case, the other drive unit for rotating the disc guide arm 53 in accordance with the diameter of the optical disc 1 may be provided to transfer the large-diameter disc 1A and the small-diameter disc 1B.

Though the disc processor 20 is pivotably attached near to the insertion-and-ejection opening 14 and near the left wall 10B, other arrangement is possible. For instance, in a normal disc drive with no thickness limitation, an arrangement is possible where the pivotal displacement on the side of the insertion-and-ejection opening 14 is magnified or both of the sides of the insertion-and-ejection opening 14 and the turntable 23 may be pivotally moved in an equal level.

Specific configurations and processes when implementing the present invention may be other configurations or the like as long as an object of the present invention can be attained.

Effects and Advantages of Embodiment

As described above, the disc device 100 of the above exemplary embodiment includes the casing 10, the disc processor 20 provided with the turntable 23 and the information processor 24 and pivotally supported within the casing 10, the drive unit 40, the transfer unit 30 and the disc clamper 70. The transfer unit 30 transfers the optical disc 1 while holding the optical disc 1 by driving the drive unit 40. The disc clamper 70 switches the drive transmission of the drive unit 40 in accordance with holding condition of the different-diameter optical disc 1 by the transfer unit 30 to pivotally move the disc processor 20.

As described above, driving the single drive unit 40 effects transfer of the optical disc 1 by the transfer unit 30 and pivotal movement of the disc processor 20 by the disc clamper 70. Accordingly, since less number of components are required than a conventional arrangement where independent drive units are required respectively for the transfer unit 30 and the disc clamper 70, the size of the disc device 100 can be reduced. Further, the disc camper 70 switches the drive transmission of the drive unit 40 in accordance with holding condition of the different-diameter optical disc 1 by the transfer unit 30. Accordingly, the timing for transferring the optical disc 1 and the timing for pivotally moving the disc processor 20 can be suitably adjusted in accordance with the diameter of the optical disc 1. Accordingly, the different-diameter optical disc 1 can be suitably processed while reducing the size of the device.

The invention claimed is:

1. A disc device, comprising:
a casing with a slit-shaped opening through which a disc-shaped recording medium with different diameters is capable of being inserted and ejected;
a traverse body comprising a turntable for detachably clamping the recording medium and an information processor that conducts at least one of recording processing for recording information on the recording medium clamped on the turntable and reading processing for reading the information stored on the recording medium, the traverse body being supported in the casing in a manner capable of pivotal movement;

a drive unit provided in the casing;

a transfer unit provided in the casing, the transfer unit holding and transferring the recording medium between the opening and a position for the recording medium to be clamped by the turntable by driving the drive unit;

a shift cam that is engaged with the traverse body and is moved in a predetermined direction by driving the drive unit to pivotally move the traverse body; and a moving unit that is moved in accordance with the holding condition of the recording medium with different diameters by the transfer unit to switch the drive transmission of the driving of the drive unit to the shift cam, wherein the transfer unit includes a cam pressing member that pushes the shift cam in a moving direction of the shift cam when the recording medium is transferred to the position for the recording medium to be clamped by the turntable, the moving unit includes a second pressing wall that is advanced and retracted along a direction intersecting the moving direction of the shift cam in conjunction with the movement of the moving unit to switch a pushing position of the shift cam by the cam pressing member.

2. The disc device according to claim 1, wherein
the moving unit is rotatably provided on the shift cam so that the second pressing wall is advanced and retracted relative to the first pressing wall.

3. The disc device according to claim 1, wherein
the first pressing wall is provided on a first end side in the moving direction of the shift cam,
the moving unit is movably provided on the first end side in the moving direction of the shift cam, and
when the moving unit is not moved, the second pressing wall is provided nearer to the first end in the moving direction than the first pressing wall.

4. The disc device according to claim 1, wherein
the transfer unit includes: a loading/unloading unit that holds and transfers the recording medium between the opening and the position for the recording medium to be clamped by the turntable in accordance with the driving of the drive unit; and an eject arm provided on a rear side of the transfer path within the casing, the eject arm having a base end rotatably supported on the casing and a tip end advanceable into and retractable from the transfer path by a rotation of the eject arm, the eject arm being rotated toward the rear side of the transfer path while holding the recording medium in cooperation with the loading/unloading unit when the recording medium is inserted from the opening, the eject arm being rotated to advance to the transfer path to transfer the recording medium toward the opening while holding the recording medium in cooperation with the loading/unloading unit,
the cam pressing member is provided on the base end of the eject arm in a manner protruding in a direction substantially opposing to the shift cam.

5. The disc device according to claim 4, wherein
the transfer unit includes a link plate provided in the casing on the rear side of the transfer path, the link plate moving in a direction intersecting the moving direction of the shift cam in conjunction with the transfer operation of the recording medium by the loading/unloading unit and the eject arm,
the link plate includes a control member detachably provided on the moving unit in accordance with the diameter of the recording medium, the control member controlling the movement of the moving unit when the recording medium is transferred to the position for the recording medium to be held by the turntable, and
the moving unit includes a control member engaging unit to which the control member is adapted to be engaged.

6. The disc device according to claim 5, wherein
the moving unit is biased in the direction intersecting the moving direction of the shift cam by a biasing unit.

* * * * *